(12) United States Patent
Hirayama et al.

(10) Patent No.: US 7,076,940 B2
(45) Date of Patent: Jul. 18, 2006

(54) GAS TURBINE CONTROL SYSTEM

(75) Inventors: Kaiichirou Hirayama, Hachiouji (JP); Tadashi Kobayashi, deceased, late of Chigasaki (JP); by Sayoko Kobayashi, legal representative, Chigasaki (JP); by Yuka Kobayashi, legal representative, Chigasaki (JP); by Hirokazu Kobayashi, legal representative, Chigasaki (JP); Tomoo Katauri, Tokyo (JP); Yasuhiko Ootsuki, Tokyo (JP); Takashi Mizuno, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/127,101

(22) Filed: May 12, 2005

(65) Prior Publication Data
US 2005/0204745 A1 Sep. 22, 2005

Related U.S. Application Data

(62) Division of application No. 10/441,106, filed on May 20, 2003, now Pat. No. 6,945,030.

(30) Foreign Application Priority Data
May 20, 2002 (JP) .............................. 2002-144099

(51) Int. Cl.
*F02C 9/50* (2006.01)
(52) U.S. Cl. .................................. 60/37.27
(58) Field of Classification Search ............. 60/39.091, 60/39.27, 39.281
See application file for complete search history.

(56) References Cited

U.S. PATENT DOCUMENTS

| | | | | |
|---|---|---|---|---|
| 3,520,133 A | * | 7/1970 | Loft et al. ............... | 60/39.281 |
| 3,638,422 A | * | 2/1972 | Loft et al. ............... | 60/39.281 |
| 5,142,860 A | * | 9/1992 | Strange et al. ........... | 60/39.281 |

FOREIGN PATENT DOCUMENTS

JP 8-218897 8/1996

OTHER PUBLICATIONS

"Dynamic Behavior of Combined Cycle Power Plant for Frequency Drop", The Transactions of the Institute of Electrical Engineers of Japan, vol., 122-B, No. 3, Mar. 1, 2002, pp. 391-400.

* cited by examiner

*Primary Examiner*—Louis J. Casaregola
(74) *Attorney, Agent, or Firm*—Oblon, Spivak, McClelland, Maier & Neustadt, P.C.

(57) ABSTRACT

A gas turbine control system is disclosed which operates to stabilize the system frequency in a case of transitional variations of the system frequency without making the strength of hot gas path parts of the gas turbine below a maximum stress value of the hot gas path parts. When a system frequency abnormality is detected, the output of the gas turbine is adjusted to recover the system frequency by making a gas turbine combustion gas temperature control inoperative. For this purpose, there are provided a logical circuit operative to make the gas turbine combustion gas temperature control disabled or inoperative in response to an abnormal system frequency detection signal, and a recovery circuit that operates to cancel the inoperative state of the gas turbine combustion gas temperature control. The detection of an abnormal system frequency may be carried out by an outside signal. An abnormality detection unit may be provided in a combined cycle plant.

12 Claims, 26 Drawing Sheets

GAS TURBINE CONTROL SYSTEM

CROSS-REFERENCE TO RELATED APPLICATIONS

This application is a divisional of U.S. patent application Ser. No. 10/441,106, filed May 20, 2003, now U.S. Pat. No. 6,945,030 and in turn claims priority to Japan Patent 2002-144099, filed May 20, 2002, the entire contents of each of which are hereby incorporated herein by reference.

BACKGROUND OF THE INVENTION

1. Field of the Invention

The present invention relates to a gas turbine control system which can prevent instability in the operation of a gas turbine which occurs when the system frequency increases or decreases in a short time from normal operational frequency due to disconnection of a load, an emergency stop of a generator and so on, and which can prevent an unstable operation as well as stoppage, which is the worst, of the gas turbine as a principal driving source of a thermal power generator, thus contributing to stabilizing the frequency of the electric power system during a transitional period.

2. Description of the Related Art

In gas turbine power generating plants, fuel and compressed air are supplied to a combustor and the combustion gas produced in the combustor is supplied to a gas turbine to operate the same. FIG. 36 shows a schematic view of a gas turbine power generating plant.

A gas turbine unit generally designated by reference numeral 100 in FIG. 36 is composed of a compressor 2, a combustor 4 and a turbine 7. Air introduced into the air compressor 2 through inlet guide vanes or blades 1 is compressed in the compressor 2 into a high-pressure air, which is sent through an air passage 3 into the combustor 4 and used as combustion air for fuel. On the other hand, the fuel is supplied through a fuel control valve 5 and a fuel burner 6 into the combustor 4 and combusted therein to produce a combustion gas at high temperature and high pressure. The combustion gas flows into the turbine 7 to rotate a gas turbine shaft 8, which drives a generator 9 to produce output of electric energy. Exhaust gas from the turbine 7 flows directly into a chimney, or, in the case of a combined-cycle power generating plant, flows into a chimney after being used as heat source for an exhaust gas heat recovery boiler.

A gas turbine control device 10 is provided for controlling gas turbine unit 100. The gas turbine control device 10 gives a fuel control signal FREF to the fuel control valve 5 to adjust the fuel flow rate, in response to a gas turbine speed N derived from a gas turbine speed sensor 12 provided adjacent to a gear 11 at the end portion of the gas turbine shaft 8, a compressor inlet air pressure PX1 derived from an inlet air pressure sensor 103 provided adjacent to the inlet portion of the air compressor 2, a compressor outlet air pressure PX2 derived from an outlet air pressure sensor 13 at the outlet portion of the air compressor 2, an exhaust gas temperature TX4 derived from an exhaust gas temperature sensor 14 provided at the outlet portion of the gas turbine 7, and a generator output MW derived from a generator output sensor 15.

FIG. 37 shows a block diagram of the gas turbine control device 10. The control device 10 includes: a speed-load control section 16 that controls the speed of the gas turbine unit 100 and the load of the generator 9 connected to the gas turbine unit 100; a combustion gas temperature control section 18 that controls the combustion gas temperature in the gas turbine unit 100 so as to be at or below a predetermined upper limit value; and a fuel control signal selection unit 17 that receives both a speed-load control signal FN from the speed-load control section 16 and an exhaust gas temperature control signal FT from the combustion gas temperature control section 18 and selects a smaller one of these received signals to output it as a fuel control signal. The combustion gas temperature control section 18 shown in FIG. 37 does not control the combustion gas temperature directly but controls the combustion gas temperature indirectly by detecting the temperature TX4 of the exhaust gas from the turbine 7.

The gas turbine unit 100 is started by increasing its rotational speed to a rated rotational speed with the fuel flow rate adjusted at a start control unit not shown. At the start of the turbine, the fuel flow rate is small so that the combustion gas temperature is low, and the speed-load control signal FN from the speed-load control section 16 is smaller than the exhaust gas temperature control signal FT from the combustion gas temperature control section 18. As a result, the speed-load control signal FN is selected at the fuel control signal selection unit 17, as a fuel selection signal FREF. Therefore, the gas turbine, which has increased in speed to the rated rotational speed by the start control unit, is maintained at the rated rotational speed by the speed-load control section 16.

The speed-load control section 16 maintains the gas turbine unit 100 at the rated rotational speed when the generator 9 is not loaded, while when the generator 9 is connected to the electric power system, the speed-load control section 16 carries out a control so that the generator 9 outputs a set value in a load setting unit 24. A rated rotational speed is set as an initial set value in a speed setting unit 19 of the speed-load control section 16, and a speed deviation NE from the rotational speed N of the gas turbine unit 100 is calculated in a subtracter 20. Proportional calculation of the speed deviation NE is carried out in a proportional control unit 21, and a no-load rated speed bias signal from a signal generator 22 is added to the proportional-calculated value to generate the speed-load control signal FN. The no-load rated speed bias signal is a signal corresponding to flow rate required to maintain the gas turbine unit 100 and the generator 9 under no-load condition to the rated rotational speed.

When the generator 9 is connected to the electric power system in the above condition, the generator 9 is rotated in synchronism with the system frequency and loaded operation takes place. In the loaded operation, a subtracter 25 calculates a generator output deviation MWE which is the difference between a generator output MW and a load set value in the load setting unit 24. When the generator output deviation MWE is negative, a comparator 26 closes a switch 27, while when the generator output deviation MWE is positive, the comparator 29 closes a switch 30.

When the generator output deviation MWE is negative, a positive value set in a signal generator 28 is input to the speed setting unit 19. The speed setting unit 19 has an integrating characteristic and increases the set value in the speed setting unit 19 at a change rate corresponding to that positive value, thereby changing the speed-load control signal FN so as to make the generator output deviation MWE null. Similarly, when the generator output deviation MWE is positive, the set value in the speed setting unit 19 is reduced at a change rate corresponding to a negative value set in a signal generator 31, thereby changing the speed-load control signal FN so as to make the generator output deviation MWE null.

In a condition in which the generator 9 is connected to the electric power system and is gradually taking a load, the generator output deviation MWE is negative, so that the comparator 27 closes the switch 27 and the set value in the speed setting unit 19 is increased at a change rate corresponding to the positive value set in the signal generator 28, whereby the generator output MW increases gradually. As a result, the exhaust gas temperature TX4 increases gradually and therefore the exhaust gas temperature control signal FT from the combustion gas temperature control section 18 is made smaller gradually.

As the fuel flow rate increases, the exhaust gas temperature TX4 increases, so that an exhaust gas temperature deviation TE decreases gradually. When the exhaust gas temperature TX4 reaches a predetermined upper limit value TXR4, the exhaust gas temperature deviation TE becomes null. When the exhaust gas temperature TX4 exceeds the predetermined upper limit value TXR4, the exhaust gas temperature deviation TE becomes negative, which causes generation of an alarm or trip of the gas turbine unit 100. Due to reduction of the exhaust gas temperature control signal FT, the value of the exhaust gas temperature control signal FT becomes smaller than the value of the speed-load control signal FN. As a result, the fuel control signal selection section 17 replaces the speed-load control signal FN with the exhaust gas temperature control signal FT, which becomes the fuel control signal FREF. Thus, the fuel control signal FREF controls the fuel flow rate to make the exhaust gas temperature TX4 of the turbine unit 100 correspond to the predetermined upper limit value TXR4.

The combustion gas temperature control section 18 has a function generator 32 for calculating an upper limit value TXR4 which is determined as a function of the compressor pressure ratio PX2/PX1. Thus, the combustion gas temperature control section 18 executes a control function to make the exhaust gas temperature TX4 of the turbine 7 equal to the predetermined upper limit value TXR4.

FIGS. 38, 39 and 40 show quantitative changes in the state of the gas turbine unit 100 using the gas turbine control device 10 shown in FIG. 37. As shown in FIG. 38, the fuel flow rate GFX increases in proportion to increase of the generator output MW. Until the generator output MW reaches a time point t1, the angle of the inlet guide vanes or blades 1 is maintained constant by means of an inlet guide vane control device, so that the compressor air flow rate GAX is maintained constant. As the generator output MW increases from the time point t1 through a time point t2 to a time point t3, the angle of the inlet guide vanes or blades 1 is increased gradually by means of the inlet guide vane control device in such a manner that the compressor air flow rate GAX is increased as shown.

As shown in FIG. 39, the combustion gas temperature TX3 increases as the generator output MW increases. When the generator output MW reaches the time point t2, the combustion gas temperature TX3 increases to the upper limit value TXR3. The reason why the compressor air flow rate GAX is maintained constant until the generator output MW reaches the time point t1, is to increase the combustion gas temperature TX3 as quickly as possible, thus raising the thermal efficiency of the gas turbine. Even when the generator output MW increases from the time point t2 to the time point t3, the combustion gas temperature TX3 is maintained at or below the upper limit value TXR3. As the generator output MW increases, the exhaust gas temperature TX4 also increases, and when the generator output MW reaches the time point t1, the exhaust gas temperature TX4 reaches the upper limit value TXR4. Even when the generator output MW increases from the time point t1 to the time point t2, the exhaust gas temperature TX4 is maintained at the upper limit value TXR4 because of the increase in the compressor air flow rate GAX by increasing the angle of the inlet guide vanes or blades 1 and because of the fuel control by the combustion gas temperature control section 18. When the combustion gas temperature TX3 is maintained constant during the increase of the generator output MW from the time point t2 to the time point t3, the exhaust gas temperature TX4 is reduced linearly as shown.

FIG. 40 shows the characteristics of the function generator 32. The compression ratio PX2/PX1 is calculated from the inlet air pressure PX1 of the compressor and the outlet air pressure PX2 of the same, and the exhaust gas temperature upper limit value TXR4 shown in solid line in the figure is generated as a function of the compression ratio PX2/PX1. The control of the exhaust gas temperature TX4 at or below the upper limit value TXR4 by means of the combustion gas temperature control section 18 is equivalent to the maintenance of the combustion gas temperature TX3 at or below the predetermined upper limit value TXR3 as shown in FIG. 39. The broken line in FIG. 40 shows an alarm issuing value for the exhaust gas temperature or a trip value for the gas turbine unit 100.

How the upper limit value TXR3 of the combustion gas is determined will be explained with reference to FIG. 41. This figure shows a relationship between the combustion gas temperature TX3 and a long-term creep strength of a material used for hot gas path parts composing the gas turbine. The temperature of the hot gas path parts increases and decreases in proportion to the temperature of the combustion gas, and the proportional constant is shown as C in this figure. As the combustion gas temperature increases, the long-term creep strength of the material drops. In order to prevent damage of the hot gas path parts, it is required to so control the combustion gas temperature that the creep strength of the material is above a maximum stress produced in the hot gas path parts.

FIG. 41 shows an example in which the upper limit value TXR3 is a value in the case where the long-term of the creep strength is a hundred thousand (100,000) hours. This means that if this value of TXR3 is adopted as the combustion gas upper limit temperature, the hot gas path parts for gas turbines can be used for a hundred thousand (100,000) hours without replacement. The upper limit value TXR4 of the exhaust gas temperature can be determined on the basis of the relationship of TXR3, TXR4 and PX2/PX1 as shown in FIGS. 38 and 39. As stated above, gas turbines that use the conventional gas turbine control device are operated within a range of allowable combustion gas temperature in which hot gas path parts of the gas turbines can be used for a long term without replacement.

The conventional gas turbine control device involves the problem described below. That is, when frequency variations occur in the electric power system, the speed-load control section 16 operates to a great extent to recover the system frequency through a high proportional gain of the proportional control unit 21, so that there occurs a great variation of the fuel flow rate with a resultant great variation of the exhaust gas temperature TX4 of the gas turbine unit 100.

Especially, in a case where a system frequency variation occurs while the gas turbine is operated with the gas turbine exhaust gas temperature TX4 being in the neighborhood of the predetermined upper limit value TXR4, the operation of the speed-load control section 16 gives a large disturbance to the control of the gas turbine fuel and air and the control of the combustion gas temperature. For example, when the system frequency is increased, the gas turbine speed N is also increased. Thus, the speed-load control section 16 operates to correct this, so that the speed-load control signal FN is decreased from the value taken immediately before the system frequency increase. This results in that the speed-load control signal FN is lower than the exhaust gas temperature control signal FT, whereby the speed-load control signal FN is selected in the fuel control signal selecting section 17 and the fuel flow is throttled. Consequently, the fuel flow rate is reduced and the exhaust gas temperature TX4 of the gas turbine unit 100 is reduced with a delay of several seconds.

If the system frequency recovers rapidly in this state, the gas turbine speed N recovers rapidly to the rated rotational speed. In this case, since delay in detecting the gas turbine speed N is negligibly small, so that the speed-load control signal FN increases rapidly. Since the fuel control signal selecting section 17 is selecting the speed-load control signal FN as the fuel control signal FREF in this state, variation in the speed-load control signal FN results in variation in the fuel flow rate and consequently the fuel flow rate increases rapidly. This is because there occurs a delay in increase of the exhaust gas temperature TX4 responsive to the rapid increase of the fuel flow rate due to a several minute delay in detecting the exhaust gas temperature TX4 of the-gas turbine unit 100 in relation to the negligible small delay in the detection of the gas turbine speed N.

For this reason, an excessive amount of fuel has been supplied when the exhaust gas temperature TX4 has reached the predetermined upper limit value TXR4 because of the rapid increase of the fuel flow rate. At that time, the fuel control signal selecting section 17 carries out switching from the speed-load control signal FN to the exhaust gas temperature control signal FT as the fuel control signal FREF, to reduce the fuel flow rate. However, since the excessive amount of fuel has already been supplied, the exhaust gas temperature TX4 continues to rise.

For a reason of operation of the gas turbine at high efficiency, the gas turbine unit 100 is run with the combustion gas temperature TX3 maintained at as high a temperature as possible, and therefore the upper limit value TXR4 is close to the alarm issuing value or the gas turbine trip value of the combustion gas temperature TX4. Under such a condition, a further temperature increase sometimes results in an undesirable situation of gas turbine trip. Further, also when the generator output MW is controlled in the condition where the exhaust gas temperature TX4 of the gas turbine unit 100 is somewhat smaller than the upper limit value TXR4 and the speed-load control signal FN is selected as the fuel control signal FREF, an abrupt drop of the system frequency causes the same undesirable situation as stated above since the speed-load control signal FN increases rapidly.

In a large-scale service interruption accident that occurred in Malaysia in 1996, a combined cycle and a gas turbine generator were disconnected successively as a result of trip that occurred in a trunk transmission line. This shows that the power plant in operation under high-load condition became unstable in relation to system frequency reduction. During high-load operation, air flow rate can be increased only slightly because of a limit to the operation of the inlet air guide blades. Furthermore, the fuel supply cannot be increased because trip occurs in the power plant when the gas turbine exhaust gas temperature increases and exceeds a limit value.

The flow rate of air to be supplied is a function of the rotational speed of the gas turbine, and when the system frequency drops, the air flow rate also decreases. Further, there is a limitation to increasing the fuel supply because of the above-mentioned limitation to the exhaust gas temperature of the gas turbine. Therefore, as the system frequency drops, the output of the combined cycle power plant decreases, which causes further drop of the system frequency, leading to a large-scale service interruption. This is reported in a thesis entitled "Dynamic Behavior of Combined Cycle Power Plant during Frequency Drop", (The transactions of the Institute of Electrical Engineers of Japan, Vol. 122-B, No. 3.2002) and in a thesis entitled "Dynamic Study of Power System including Combined Cycle Power Plant" (Thesis No. 6-070, 2002, The Institute of Electrical Engineers of Japan).

In the above situation, the system frequency drops when the generator in operation, connected in parallel to an electric power system is disconnected or when a load such as a generator-motor in the pumped-storage power plant or an induction motor is started. On the other hand, the system frequency increases when the load is disconnected in the system rapidly. During a large-scale system frequency variation in which trip of a combined cycle Power Plant occurs, for example, control is carried out to stabilize the system frequency by disconnecting a load in the system or by adjusting the output of the generator in operation. In this case, it is possible to quickly take a measure to reduce the output of the generator, but increasing the generator output requires several tens seconds depending upon the characteristics of the plant because the output of the exhaust heat recovery boiler must be increased to increase the generator output. Therefore, it is required to provide the gas turbine with a capability of continued operation with as high an output as possible.

It is an object of the present invention to provide a gas turbine control system which contributes to stabilization of the system frequency in cases of transitional or temporary variations of the system frequency without making the strength of hot gas path parts of the gas turbine at below a maximum stress value of the hot gas path parts.

SUMMARY OF THE INVENTION

To achieve the above object, the present invention provides a gas turbine control system for controlling a gas turbine unit including an air compressor for producing compressed air, the compressor having inlet guide vanes or blades for adjusting an air flow rate into the compressor, a combustor for combusting a fuel mixed with the compressed air from the compressor to produce a combustion gas, a gas turbine receiving the combustion gas from the combustor and driven by the combustion gas to drive the compressor; and an electric generator driven by the gas turbine unit and connected to an electric power system: the gas turbine control system comprising: inlet guide blade control means that controls the inlet guide vanes or blades to change the air flow rate into the compressor; a fuel control valve provided to change flow rate of the fuel into the combustor; speed-load control means including a speed control means and a load control means, the speed-load control means operating on the fuel control valve to control the flow rate of the fuel so that the gas turbine has a rotational speed coinciding with a set speed value; combustion gas temperature control means that controls the flow rate of the fuel so that the combustion gas temperature does not exceed a set temperature value; a system frequency abnormality sensor that operates to detect such a variation of frequency of the electric power system as to cause the power system to go out of normal operation; and the combustion gas temperature control means having disabling means responsive to operation of the system frequency abnormality sensor to make the combustion gas temperature control means inoperative to thereby have the fuel control valve controlled by the speed-load control means, to restore a system frequency. The detection of the system frequency abnormality may be made by receiving an outside signal, and the system frequency abnormality may be provided in a combined cycle plant.

According to the above gas turbine control system, when a system frequency abnormality is detected, the control of the gas turbine combustion gas temperature is disabled or made inoperative so that the gas turbine output can be adjusted to contribute to recovery of the system frequency. This can be realized by making the combustion gas temperature signal higher than the speed-load control signal by a predetermined amount so that the speed-load control signal is selected for the turbine output control without influence of the combustion gas temperature. Upon the system frequency is restored, the control operation returns to that before the system frequency abnormality is detected and the combustion gas temperature control is carried out again.

The disabling means may have means to make the combustion gas temperature control means inoperative during a length of time in which the system frequency is expected to recover. With this configuration, the control automatically returns to the regular control in which the combustion gas temperature control is carried out, upon elapse of a certain length of time.

According to another aspect of the invention, there is provided a gas turbine control system for controlling the gas turbine unit including an air compressor for producing compressed air, the compressor having inlet guide vanes or blades for adjusting an air flow rate into the compressor, a combustor for combusting a fuel mixed with the compressed air from the compressor to produce a combustion gas, a gas turbine receiving the combustion gas from the combustor and driven by the combustion gas to drive the compressor; and an electric generator driven by the gas turbine unit and connected to an electric power system: the gas turbine control system comprising: inlet guide blade control means that controls the inlet guide vanes or blades to change the air flow rate into the compressor; a fuel control valve provided to change flow rate of the fuel into the combustor; speed-load control means including a speed control means and a load control means, the speed-load control means operating on the fuel control valve to control the flow rate of the fuel so that the gas turbine has a rotational speed coinciding with a set speed value; normal combustion gas temperature control means that controls the flow rate of the fuel so that the combustion gas temperature does not exceed a normal combustion gas temperature limit value; emergency combustion gas temperature control means that controls the flow rate of the fuel so that the combustion gas temperature does not exceed an emergency combustion gas temperature limit value; and a system frequency abnormality sensor that operates to detect such a variation of frequency of the electric power system as to cause the power system to go out of normal operation; switching means that operates in response to operation of the system frequency abnormality sensor to make the normal combustion gas temperature control means inoperative and make the emergency combustion gas temperature control means operative, whereby output of the gas turbine is controlled to stabilize a system frequency.

In this aspect of the gas turbine control system, upon detection of a system frequency abnormality, the control is changed over to the emergency combustion gas temperature control in which a higher combustion gas temperature limit value is used, whereby the gas turbine output can be increased and consequently the system frequency can be stabilized.

The normal combustion gas temperature control means may include means for comparing a detected turbine exhaust gas temperature with a normal exhaust gas temperature limit value determined as a function of a ratio of a compressor inlet air pressure to a compressor outlet air pressure, to output a signal for controlling the flow rate of the fuel to consequently prevent the combustion gas temperature from exceeding the normal combustion gas temperature limit value, and the emergency combustion gas temperature control means may include means for comparing the turbine exhaust gas temperature with an emergency exhaust gas temperature limit value determined as a function of a ratio of a compressor inlet air pressure to a compressor outlet air pressure, to output a signal for controlling the flow rate of the fuel to consequently prevent the combustion gas temperature from exceeding the emergency combustion gas temperature limit value.

In this case, not the directly detected combustion gas but the exhaust gas temperature is used for the combustion gas temperature control, so that a high reliability of the combustion gas temperature detection is obtained in both the normal and emergency combustion gas temperature controls, whereby stabilization of the system frequency is ensured.

The normal combustion gas temperature control means may include means for comparing a detected combustion gas temperature with a normal combustion gas temperature limit value, to output a signal for controlling the flow rate of the fuel so as to prevent the combustion gas temperature from exceeding the normal combustion gas temperature limit value, and the emergency combustion gas temperature control means may include means for comparing the combustion gas temperature with an emergency combustion gas temperature limit value, to output a signal for controlling the flow rate of the fuel so as to prevent the combustion gas temperature from exceeding the emergency combustion gas temperature limit value.

In this case, since the directly detected combustion gas temperature is used for the combustion gas temperature control, a good response in control operation can be obtained especially in the emergency combustion gas control which requires quick response, whereby stabilization of the system frequency is ensured The normal combustion gas temperature control means may include an arithmetic unit that receives as inputs thereto a compressor air flow rate, a compressor outlet air temperature and the fuel flow rate to calculate and output a combustion gas temperature, the normal combustion gas temperature control means may further include means for controlling the flow rate of the fuel to the combustor so as to prevent the combustion gas temperature from exceeding a normal combustion gas temperature limit value. Further, the emergency combustion gas temperature control means may include an arithmetic unit that receives as inputs thereto the compressor air flow rate, the compressor outlet air temperature and the fuel flow rate to calculate and output the combustion gas temperature. The emergency combustion gas temperature control means may further include means for controlling the flow rate of the fuel to the combustor so as to prevent the combustion gas temperature from exceeding an emergency combustion gas temperature limit value.

In this case, not the combustion gas temperature but the compressor air flow rate, the compressor outlet air temperature and the fuel flow rate are used to calculate a value representing the combustion gas temperature, a high reliability in the detection of the temperature detection and a good response can be obtained in both the normal and emergency combustion gas controls, whereby stabilization of the system frequency is ensured in short time.

The normal combustion gas temperature control means may have the normal combustion gas temperature limit value which is a combustion gas temperature at which a sum of a fuel cost and a hot gas path parts replacement cost takes a minimum value when the gas turbine is operated for a long term.

Thus, the gas turbine can be operated for a long term in the most economical condition.

The emergency combustion gas temperature control means may have the emergency combustion gas temperature limit value which is a temperature selected from any one or a smallest one of Ta, Tb, Tc and Td, where Ta is a combustion gas upper limit value determined on the basis of a short-term allowable creep strength of a material of hot gas path parts used in the gas turbine, Tb is a combustion gas upper limit value determined on the basis of an allowable yield strength of the hot gas path parts, Tc is a combustion gas upper limit value corresponding to an allowable upper limit temperature value of a heat-resistant coating on the hot gas path parts, and Td is a combustion gas upper limit value determined on the basis of a surging limit of the compressor.

Thus, stabilization of the system frequency is ensured while preventing damage to the hot gas path parts and maintaining the stability of the compressor operation.

The switching means may have means to make the normal combustion gas temperature control means inoperative and make the emergency combustion gas temperature control means operative for a length of time within which the system frequency is expected to recover.

Thus, the combustion gas temperature control automatically takes the normal combustion gas temperature control mode after the length of time has elapsed, with the system frequency restored.

According to a further aspect of the invention, there is provided a gas turbine control system for controlling a gas turbine unit including an air compressor for producing compressed air, the compressor having inlet guide vanes or blades for adjusting an air flow rate into the compressor, a combustor for combusting a fuel mixed with the compressed air from the compressor to produce a combustion gas, a gas turbine receiving the combustion gas from the combustor and driven by the combustion gas to drive the compressor; and an electric generator driven by the gas turbine unit and connected to an electric power system: the gas turbine control system comprising: inlet guide blade control means that controls the inlet guide vanes or blades to change the air flow rate into the compressor, the inlet guide blade control means being changeable between a normal inlet guide blade control mode and an emergency inlet guide blade control mode; a fuel control valve provided to control flow rate of the fuel into the combustor; speed-load control means including a speed control means and a load control means, the speed-load control means operating on the fuel control valve to control the flow rate of the fuel so that the gas turbine has a rotational speed coinciding with a set speed value; combustion gas temperature control means that controls the flow rate of the fuel so that the combustion gas temperature does not exceed a combustion gas temperature limit value; a system frequency abnormality sensor that operates to detect such a variation of frequency of the electric power system as to cause the power system to go out of normal operation; and changeover means that operates in response to operation of the system frequency abnormality sensor to change over the inlet guide blade control means from the normal inlet guide blade control mode to the emergency inlet guide blade control mode, whereby output of the gas turbine is controlled to stabilize a system frequency.

In this aspect of the invention, when the system frequency varies, the inlet guide blade control is switched from the normal inlet guide blade control mode to the emergency inlet guide blade control mode in which the air flow rate is increased, so that the gas turbine output is increased and the system frequency can be stabilized under the speed-load control.

The inlet guide blade control means in the normal inlet guide blade control mode may have an upper limit angle of the inlet guide vanes or blades, at which the value of compressor efficiency takes a maximum value, and the inlet guide blade control means in the emergency inlet guide blade control mode may have an upper limit angle of the inlet guide vanes or blades, at which the value of compressor air flow rate takes a maximum value.

In this case, when the system frequency abnormality is occurring, the gas turbine can be operated for a long term in the most economical condition and with an increased output, for restoring the regular system frequency.

Preferably, the changeover means is operative to change over the inlet guide blade control means from the normal inlet guide blade control mode to the emergency inlet guide blade control mode, for a length of time within which the system frequency is expected to recover.

Thus, when the system frequency is restored, the gas turbine control system automatically returns to the normal operation using the normal inlet guide blade control means.

According to a still further aspect of the invention, there is provided a gas turbine control system for controlling a gas turbine unit including an air compressor for producing compressed air, the compressor having inlet guide vanes or blades for adjusting an air flow rate into the compressor, a combustor for combusting a fuel mixed with the compressed air from the compressor to produce a combustion gas, a gas turbine receiving the combustion gas from the combustor and driven by the combustion gas to drive the compressor and an electric generator driven by the gas turbine unit and connected to an electric power system: the gas turbine control system comprising: inlet guide blade control means that controls the inlet guide vanes or blades to change the air flow rate into the compressor; a fuel control valve provided to change flow rate of the fuel into the combustor; speed-load control means including a speed control means and a load control means, the speed-load control means operating on the fuel control valve to control the flow rate of the fuel so that the gas turbine has a rotational speed coinciding with a set speed value; combustion gas temperature control means that controls the flow rate of the fuel so that the combustion gas temperature does not exceed a set temperature value; a system frequency abnormality sensor that operates to detect such a variation of frequency of the electric power system as to cause the power system to go out of normal operation; and limiter means for limiting a response of the speed control means of the speed-load control means in response to operation of the system frequency abnormality sensor, for a length of time within which the system frequency is expected to recover.

According to this aspect of the invention, since the speed control means has a limiter means, it is possible to limit temporary variations of the combustion gas flow rate, thus preventing excessively high or low temperature of the combustion gas and loss of flame in the gas turbine.

According to a further aspect of the invention, there is provided a gas turbine control system for controlling a gas turbine unit including an air compressor for producing compressed air, the compressor having inlet guide vanes or blades for adjusting an air flow rate into the compressor, a combustor for combusting a fuel mixed with the compressed air from the compressor to produce a combustion gas, a gas turbine receiving the combustion gas from the combustor and driven by the combustion gas to drive the compressor and an electric generator driven by the gas turbine unit and connected to an electric power system: the gas turbine control system comprising: inlet guide blade control means that controls the inlet guide vanes or blades to change the air flow rate into the compressor; a fuel control valve provided to change flow rate of the fuel into the combustor; speed-load control means including a speed control means and a load control means, the speed-load control means operating on the fuel control valve to control the flow rate of the fuel so that the gas turbine has a rotational speed coinciding with a set speed value; combustion gas temperature control means that controls the flow rate of the fuel so that the combustion gas temperature does not exceed a set temperature value; a system frequency abnormality sensor that operates to detect such a variation of frequency of the electric power system as to cause the power system to go out of normal operation; and limiter means for changing a control constant for use in control of the flow rate of the fuel in response to an increase of the system frequency as detected by the system frequency abnormality sensor, to prevent loss of flame in the gas turbine.

According to this further aspect of the invention, when the system frequency increases in response to an increase in the system frequency, the limiter means for changing a control constant provided in the speed-load control means or the combustion gas control means operates to change the control constant, whereby loss of flame of the gas turbine can be avoided even in the case of a temporary rapid reduction of the fuel flow rate.

The system frequency abnormality sensor may be provided to detect a system frequency abnormality by comparing an exhaust gas temperature of the gas turbine and an exhaust gas temperature limit value determined on the basis of the system frequency. Alternatively, the system frequency abnormality sensor may be provided to detect a system frequency abnormality by comparing a combustion gas temperature and a combustion gas temperature limit value determined on the basis of the system frequency.

In the above case, a system abnormality sensor is provided wherein when the temperature of the exhaust gas or the combustion gas exceeds an upper limit value for the exhaust gas or the combustion gas, respectively, the combustion gas temperature control is revived.

The system frequency abnormality sensor may be provided to prevent detection of a system frequency abnormality when it detects at least one of a generator voltage reduction and an abrupt increase of a generator current.

Thus, there is provided a system frequency abnormality sensor which does not operate by error even in the case of a power system failure since a generator voltage reduction or an abrupt increase of the generator current is detected singly or in combination.

The system frequency abnormality sensor may be provided to operate in relation to an endurance (a fatigue life) determined on the basis of the system frequency and one of an exhaust gas temperature and a combustion gas temperature.

In this case, there is provided a system frequency abnormality sensor which makes the combustion gas temperature control inoperative when the system frequency drops below a predetermined value and which makes the combustion gas temperature control operative for the protection of the gas turbine when the endurance has elapsed.

Further, the system frequency abnormality sensor may be provided to operate on the basis of a variation of the system frequency out of a predetermined range of the system frequency and a signal of disconnection of the generator from the electric power system.

Thus, a reliable system frequency abnormality sensor can be provided since a variation of the system frequency and a signal of disconnection of the generator are taken into account when detecting a frequency abnormality.

The system frequency abnormality sensor may be provided to operate on the basis of a variation of the system frequency out of a predetermined range of the system frequency and a signal of system separation.

Thus, a reliable system frequency abnormality sensor can be provided since a variation of the system frequency and a signal of system separation are taken into account when detecting a frequency abnormality.

The system frequency abnormality sensor may operate on the basis of a variation of the system frequency out of a predetermined range of the system frequency and a variation in the output of the generator.

Thus, a reliable system frequency abnormality sensor can be provided since a variation of the system frequency and a variation in the generator output are taken into account when detecting a frequency abnormality.

The system frequency abnormality sensor may operate on the basis of a variation of the system frequency out of a predetermined range of the system frequency, a signal of disconnection of the generator from the electric power system and a variation in the output of the generator.

Thus, a reliable system frequency abnormality sensor can be provided since a variation of the system frequency, a variation in the generator output and a variation in the generator output are taken into account when detecting a frequency abnormality.

DESCRIPTION OF THE PREFERRED EMBODIMENTS

Figure 1:
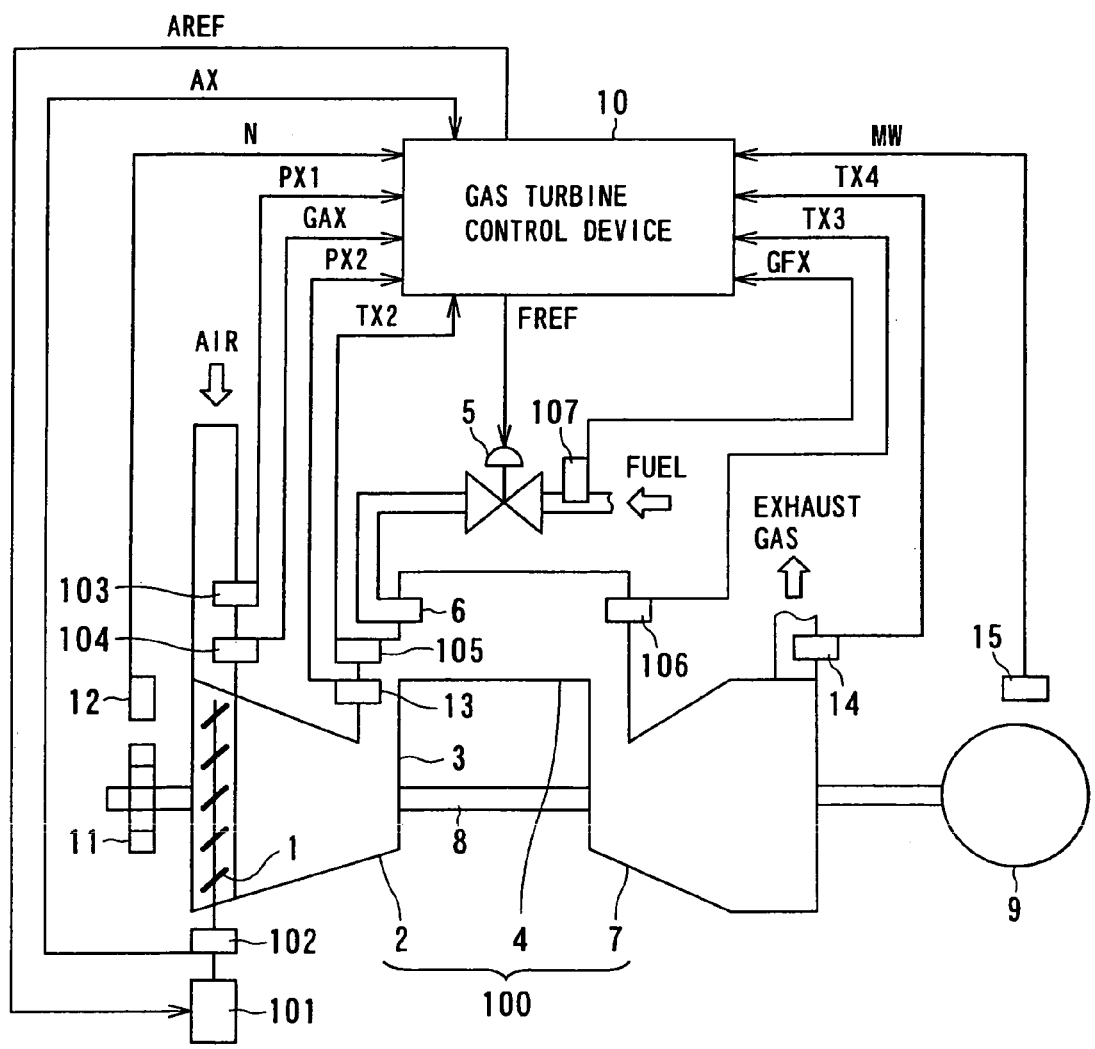
FIG. 1 is a schematic view of the gas turbine control system of the invention and a gas turbine power generating plant.

Embodiments of the present invention will be described below with reference to the accompanying drawings. The same elements and parts as those of the prior art are applied with the same reference characters as used in connection with the description of the prior art, and description of the same elements and parts will be dispensed with.

FIG. 1 shows an embodiment of the gas turbine control system according to the present invention. A gas turbine unit generally designated by reference numeral 100 is composed of an air compressor 2, a combustor 4 and a turbine 7. Air is introduced into the air compressor 2 through inlet guide vanes 1 provided at the inlet part of the compressor 2. The introduced air is compressed in the compressor 2 into a high-pressure air, which is sent through an air passage 3 into the combustor 4 and used as combustion air for fuel. On the other hand, the fuel is supplied through a fuel control valve 5 and a fuel burner 6 into the combustor 4 and combusted therein to produce a combustion gas at high temperature and high pressure. The combustion gas flows into the turbine 7 to rotate a gas turbine shaft 8, which drives a generator 9 coaxial with the turbine 7 to produce output of electric energy.

Exhaust gas from the turbine 7 flows directly into a chimney, or, in the case of a combined-cycle power generating plant, flows into a chimney after being used as heat source for an exhaust gas heat recovery boiler. At one end of the gas turbine shaft 8 is attached a gear 11 used to detect the rotational speed of the turbine, and a speed sensor 12 is provided adjacent to the gear 11. An inlet guide vane or blade drive device 101 is provided to change the angle of the inlet guide vanes or blades 1. An angle sensor 102 is provided to detect the angle of the inlet guide vanes or blade 1. At the air inlet portion of the compressor 2 are provided an inlet air pressure sensor 103 and an inlet air flow rate sensor 104. At the outlet portion of the compressor 2 are provided a compressor discharge pressure sensor 13 and a compressor discharge temperature sensor 105. The outlet portion of the combustor 4 has a combustion gas temperature sensor 106. At the outlet portion of the turbine 7 is provided an exhaust gas temperature sensor 14. A fuel flow rate sensor 107 is provided in a fuel supply pipe. Further, a generator output sensor 15 is provided to detect the output of the generator 9.

A gas turbine control device 10 is provided to send a fuel control signal FREF to the fuel control valve 5 for controlling the fuel flow rate and to send an inlet guide vane or blade control signal AREF to the inlet guide vane or blade drive device 101, thus adjusting the angle of the inlet guide vanes or blades 1. The gas turbine control device 10 operates to send out the above signals in response to a signal of the gas turbine speed N derived from the speed sensor 12, a signal of an inlet guide vane or blade angle AX derived from the angle sensor 102, a compressor inlet air pressure PX1 derived from the inlet air pressure sensor 103, a signal of a compressor air flow rate GAX derived from the inlet air pressure sensor 104, a signal of a compressor outlet air pressure PX2 derived from the outlet air pressure sensor 13, a signal of a combustion air temperature TX3 derived from the combustion gas temperature sensor 106, a signal of an exhaust gas temperature TX4 derived from the exhaust gas temperature sensor 14, a signal of a fuel flow rate GFX derived from the fuel flow rate sensor 107, and a generator output MW derived from the generator output sensor 15.

Figure 2:
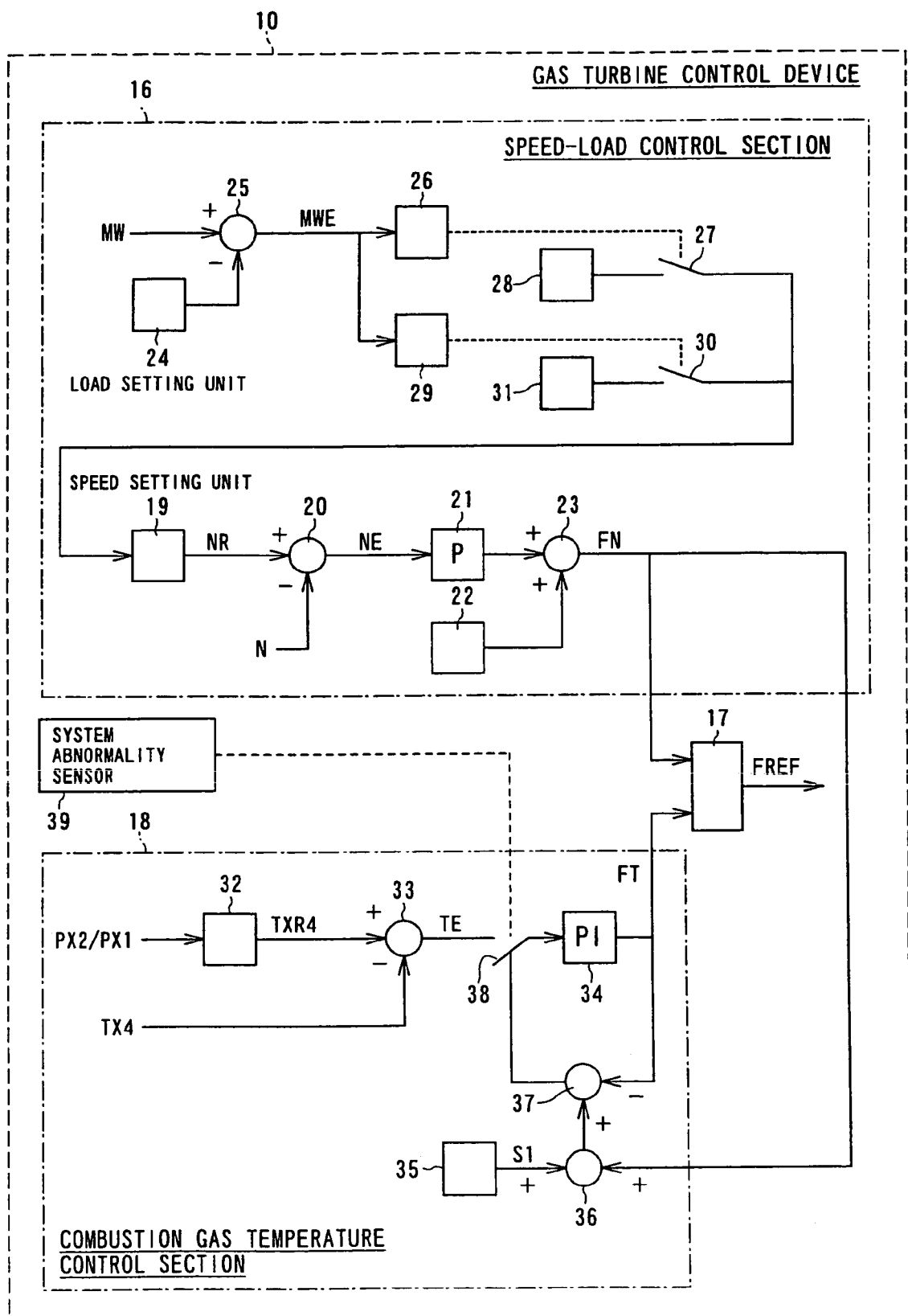
FIG. 2 is a block diagram showing a first embodiment of the invention.
Figure 37:
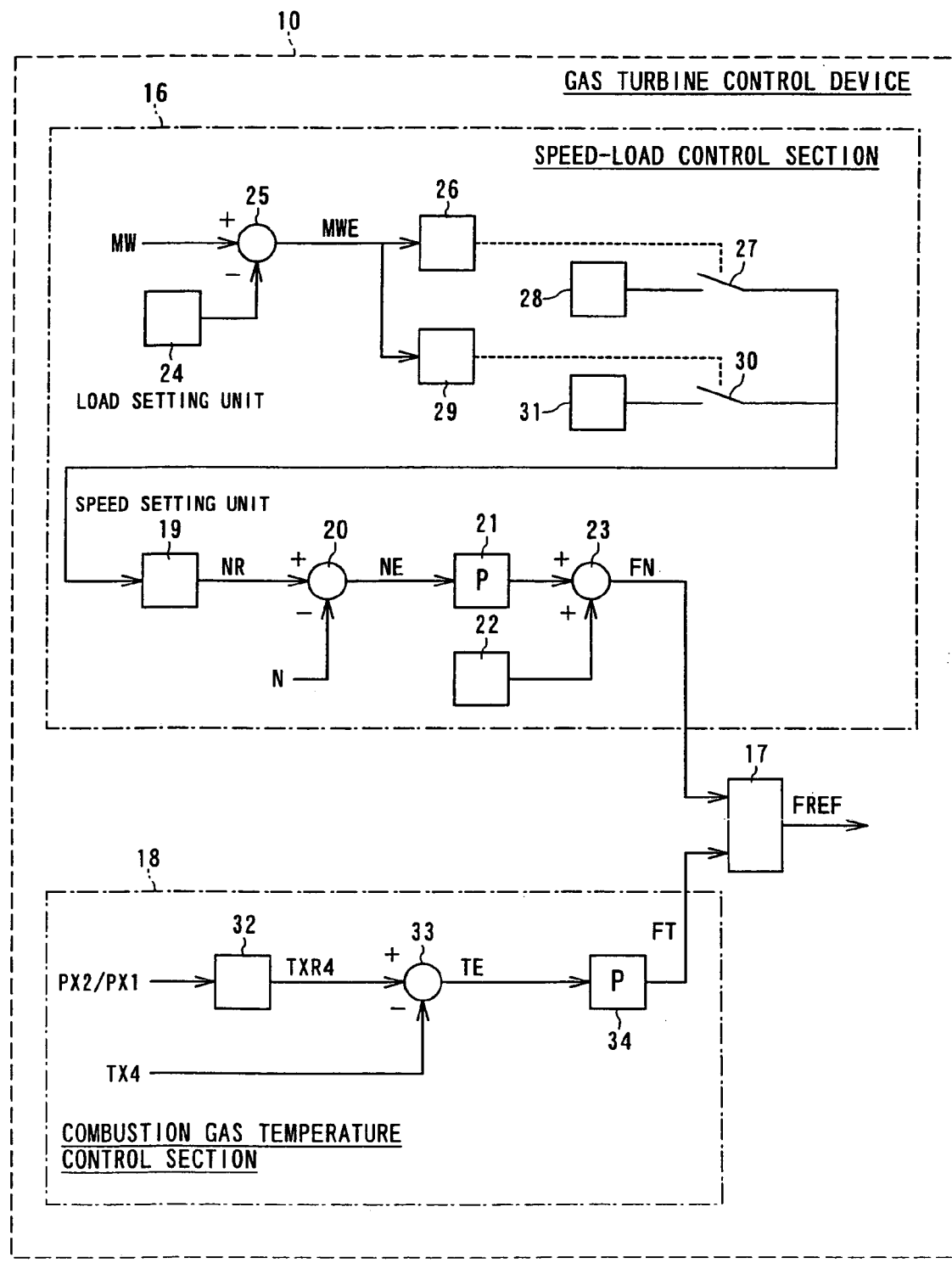
FIG. 37 is a block diagram showing the prior art gas turbine control system.
Figure 38:
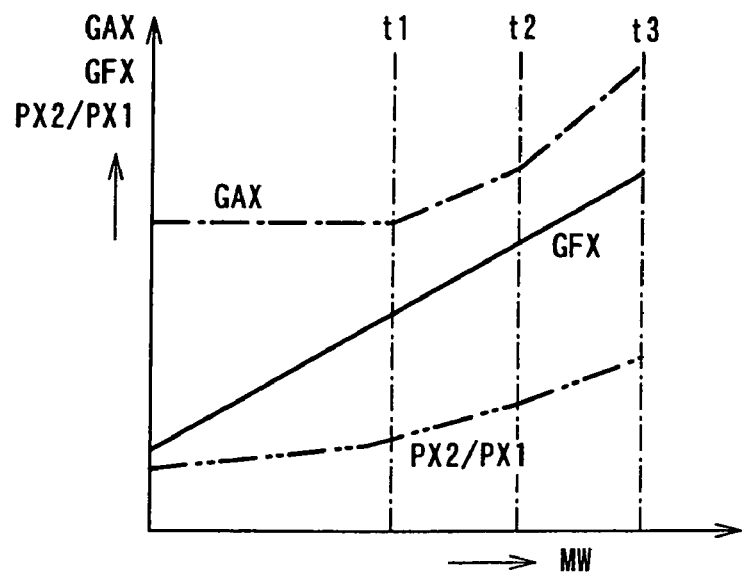
FIG. 38 is a graph showing quantitative changes (compressor air flow rate, etc.) of the state of a prior art gas turbine unit.
Figure 39:
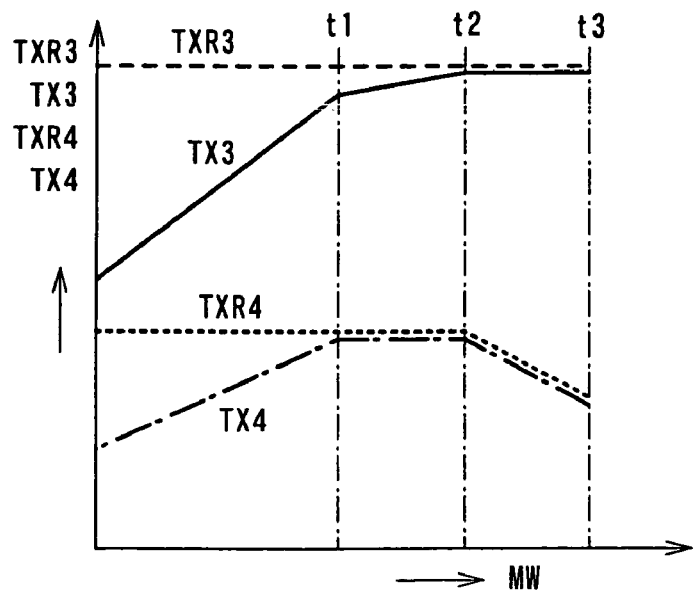
FIG. 39 is a graph showing quantitative changes (combustion gas temperature, etc.) of the state of a prior art gas turbine unit.
Figure 40:
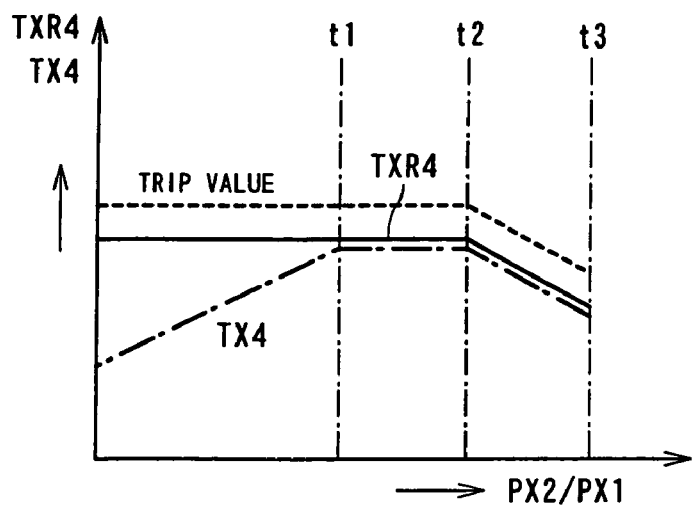
FIG. 40 is a graph showing quantitative changes (exhaust gas temperature, etc.) of the state of a prior art gas turbine unit.
Figure 41:
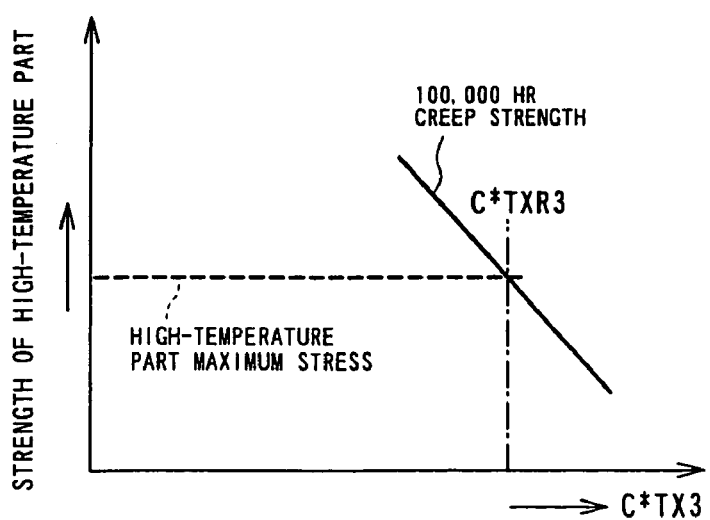
FIG. 41 is a graph explaining how to determine an upper limit value of the combustion gas temperature in the prior art.

FIG. 2 is a block diagram showing a first embodiment of the invention. The same elements as those of the prior art gas turbine control system shown in FIG. 37 are designated by the same reference characters, and description of these same elements are dispensed with. As in the case of the gas turbine control system of FIG. 37, the gas turbine control device 10 includes a speed-load control section 16 and a combustion gas temperature control section 18. The speed-load control section 16 in FIG. 2 is the same as the speed-load control section 16 in FIG. 37. The combustion gas temperature control section 18 in FIG. 2 is similar to the combustion gas temperature control section 18 in FIG. 37 but has the same elements as the gas turbine control system of FIG. 37 but has additional elements described below. That is, the first embodiment of the invention is provided with a signal generator 35 giving a set value S1, an adder 36 that adds the speed-load control signal FN to the set value S1, a subtracter 37 that subtracts the exhaust gas temperature control signal FT from the output signal (FN+S$_1$) of the adder 36, a switch 38 that selects either one of the output of the subtracter 37 and the signal (the exhaust gas temperature deviation) TE from the subtracter 33, and a system abnormality sensor 39 that determines the direction of selection by the switch 38.

In FIG. 2, the switch 38 is shown at a position in which the system abnormality sensor 39 detects a drop of the system frequency (commercial frequency) and the switch 38 is operated in response thereto with the result that the output of the subtracter 37 is input to a proportional integrator 34. When the system frequency f drops below a rated frequency and this is detected by the system abnormality sensor 39 as a system frequency abnormality, the proportional integrator 34 is so adjusted, as shown in FIG. 2, that the operated value in the proportional integrator 34 makes the exhaust gas temperature control signal FT equivalent to a sum of the speed-load control signal FN and the set positive value S1, in other words, equivalent to the output signal of the adder 36. This means that the exhaust gas temperature control signal FT is adjusted to a value that is greater than the speed-load control signal FN by the set value S1.

It is assumed that the speed-load control signal FN is smaller than the exhaust gas temperature control signal FT and therefore the fuel control signal selection unit 17 is selecting the speed-load control signal FN as the fuel control signal FREF. If the system frequency f drops in this state, the speed-load control signal FN and therefore the fuel control signal FREF increase as the gas turbine speed N decreases, whereby the fuel flow rate increases, because the value of the system frequency f is equal to the value of the gas turbine speed N in the state in which the generator 9 is connected to the electric power system. Further, when the gas turbine speed N drops, the flow rate of the combustion air from the air compressor 2 decreases, so that the generator output MW drops, while the ratio (fuel flow rate/air flow rate) increases so that both the combustion gas temperature TX3 and the gas turbine exhaust gas temperature TX4 increase.

When such situation occurs in the prior art case shown in FIG. 37, the exhaust gas temperature signal FT is decreased and suppresses the increase of the exhaust gas temperature TX4, and the switching occurs to use the exhaust gas temperature signal FT in place of the speed-load control signal FN as the fuel control signal FREF. Therefore, there is no further increase of the fuel flow rate. In contrast, in the case of the first embodiment of the invention shown in FIG. 2, the exhaust gas temperature control signal FT is adjusted to be greater than the speed-load control signal FN by the set value S1, in response to the signal from the system abnormality sensor 39. Therefore, the speed-load control signal FN and hence the fuel control signal FREF increase in response to the drop of the system frequency f and the gas turbine speed N, so that the fuel flow rate increases.

For this reason, it is possible to increase the system frequency f to restore the rated frequency by increasing the generator output MW. The exhaust gas temperature control signal FT being not selected as the fuel control signal FREF means that the operation of the combustion gas temperature control section 18 is inoperative or disabled. Thus, disabling means for disabling the operation of the combustion gas temperature control section 18 is provided. In the first embodiment of the invention, the exhaust gas temperature control signal FT is made higher than the speed-load control signal FN by the-set signal value S1, but the invention is not limited to this.

Figure 3:
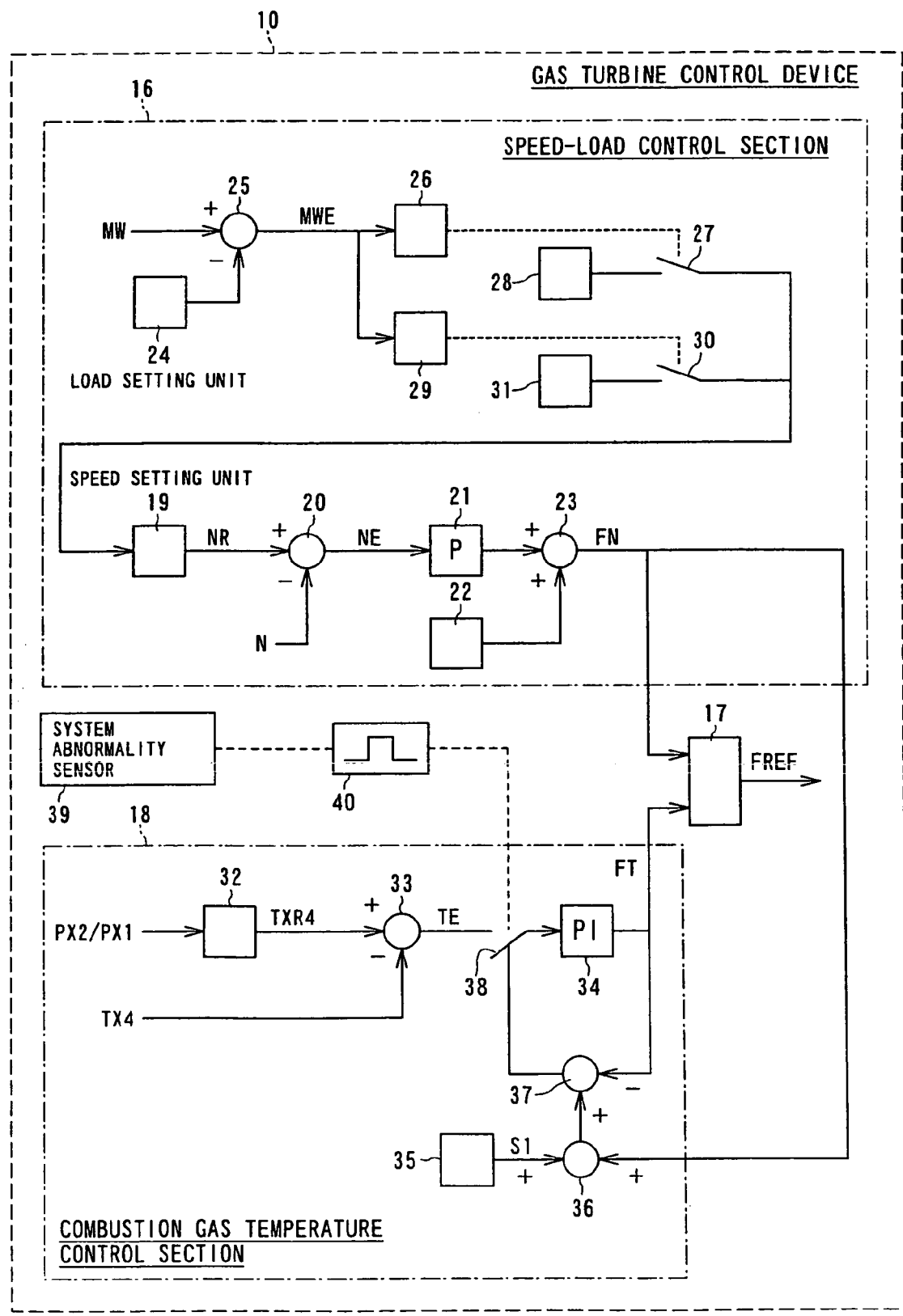
FIG. 3 is a block diagram showing a second embodiment of the invention.

A second embodiment of the invention will be described with reference to the block diagram of FIG. 3. The same elements as in the first embodiment are denoted by the same reference characters and description thereof is dispensed with. The second embodiment has an additional element that is a timer 40. In this timer 40 is set a time within which the system frequency is expected to recover to a rated frequency based on the characteristics of the entire system. When the system frequency drops, the system abnormality sensor 39 detects this. Upon the abnormality detection by the sensor 39, the timer 40 begins to operate for the set period of time and selects the switch 38 at the position shown in FIG. 3. Upon elapse of the set time, the timer 40 operates to restore the position of the switch 38, when it is expected that the system frequency has been restored, so that the signal TE is sent to the proportional integrator 34 and the normal combustion gas temperature control is executed. It will be noted that the combustion gas temperature control function returns to its normal condition to protect the gas turbine within a shortest possible time.

Figure 4:
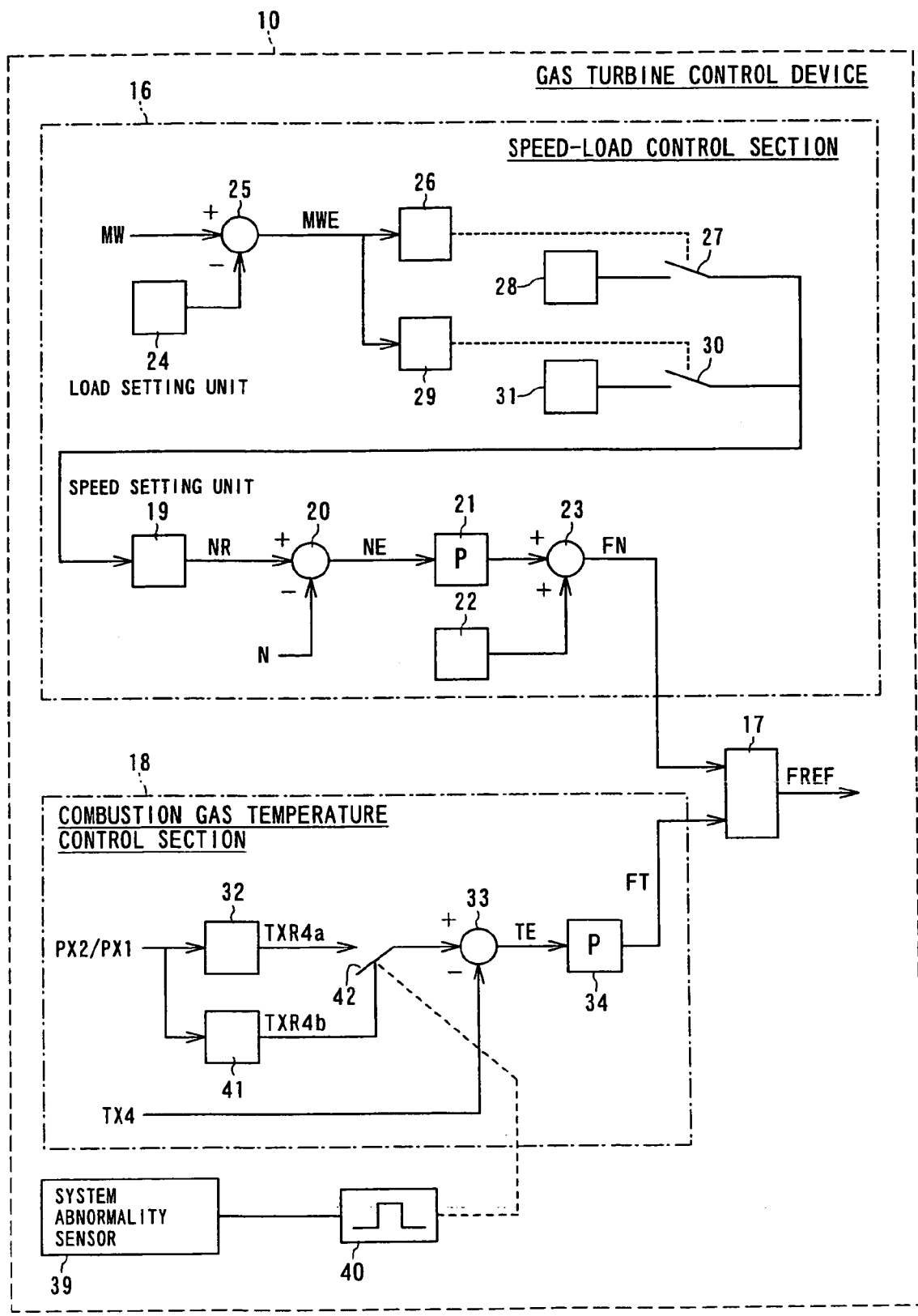
FIG. 4 is a block diagram showing a third embodiment of the invention.

FIG. 4 shows a third embodiment of the invention. The same elements as in the first and second embodiments will not be explained. In the gas turbine control system 10, the combustion gas temperature control section 18 includes a function generator 32, a function generator 41, a switch 42, a subtracter 33 and a proportional integrator 34, as shown. The compressor inlet air pressure PX1 and the compressor outlet air pressure PX2 are input to the function generator 32, which outputs a normal limit value TXR4a as a function of the ratio PX2/PX1, while the compressor inlet air pressure PX1 and the compressor outlet air pressure PX2 are input to the function generator 41, which outputs an emergency limit value TXR4b as a function of the ratio PX2/PX1. When the system abnormality sensor 39 is not in operation, the switch 42 is connected to the function generator 32, while when the system abnormality sensor 39 is in operation, the switch 42 is connected to the function generator 41. The timer 40 operates to interrupt the signal from the system abnormality sensor 39 and connect the switch 42 to the function generator 32, upon elapse of the set time from the operation of the system abnormality sensor 39. To the subtracter 33 are input the limit value TXR4 from the function generator 32 or 41, and the exhaust gas temperature TX4. The subtracter 33 outputs the temperature deviation TE, which is sent to the proportional integrator 34 which in turn outputs the combustion gas temperature signal FT. The combustion gas temperature signal FT is sent to the fuel control signal selection unit 17. It will be noted that the switch 42 constitutes a switching means.

Figure 5:
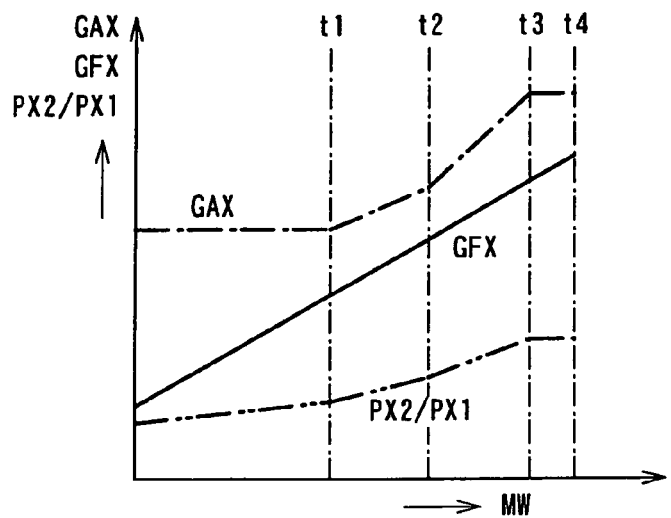
FIG. 5 is a graph showing quantitative changes (air flow rate of a compressor, etc.) of the state of a gas turbine unit used in the third embodiment of the invention.
Figure 6:
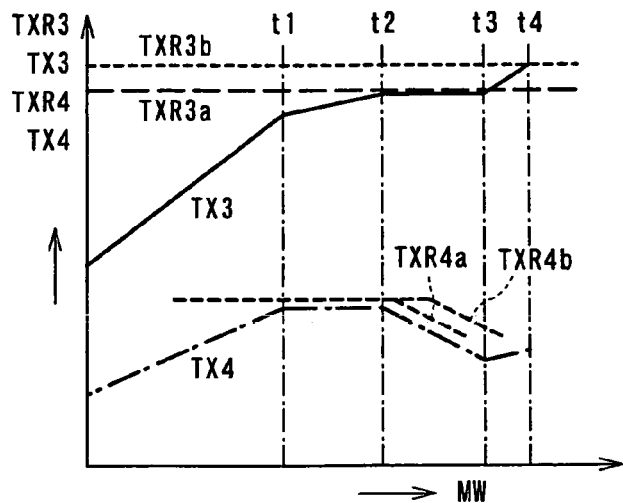
FIG. 6 is a graph showing quantitative changes (combustion gas temperature, etc.) of the state of a gas turbine unit used in the third embodiment of the invention.
Figure 7:
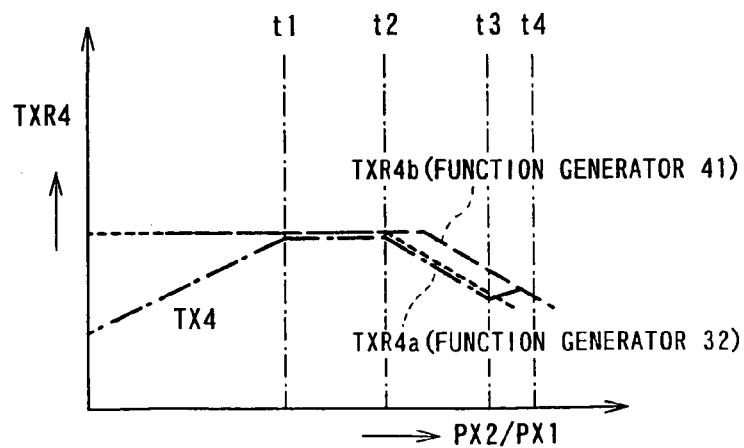
FIG. 7 is a graph showing quantitative changes (exhaust gas temperature, etc.) of the state of a gas turbine unit used in the third embodiment of the invention.

FIGS. 5, 6 and 7 show quantitative changes in the state of the gas turbine unit 100 using the gas turbine control system 10 shown in FIG. 4. As shown in FIG. 5, the fuel flow rate GFX increases as the generator output MW increases, in proportion to the generator output MW. Until the generator output MW reaches the time point t1, the angle of the inlet guide vanes 1 is maintained constant by means of the inlet guide vane drive device 101, so that the compressor air flow rate GAX is maintained constant. As the generator output MW increases from the time point t1 to the time point t3, the angle of the inlet guide vanes 1 is gradually increased by means of the inlet guide vane drive device 101. As a result, the compressor air flow rate GAX is increases as shown. As the generator output MW increases, the pressure ratio PX2/PX1 increases as shown.

In FIG. 6, as the generator output MW increases, the combustion gas temperature TX3 increases, and, upon the generator output MW reaching the time point t2, the combustion gas temperature TX3 goes up to the upper limit value TXR3a. The reason why the compressor air flow rate GAX is maintained constant until the generator output MW reaches the time point t1, is to increase the combustion air temperature TX3 as quickly as possible to thus increase the gas turbine efficiency. Even when the generator output MW increases from the time point t2 to the time point t3, the combustion gags temperature TX3 is maintained at or below the upper limit value TXR3a. As the generator output MW increases, the exhaust gas temperature TX4 also increases, and when the generator output MW reaches the time point t1, the exhaust gas temperature TX4 reaches the normal limit value TXR4a. Even when the generator output MW increases from the time point t1 to the time point t2, the exhaust gas temperature TX4 is maintained at or below the normal limit value TXR4a because the angle of the inlet guide blades or vanes 1 is increased by means of the inlet guide blade or vane drive device 101 to thereby increase the compressor air flow rate GAX and because the fuel control is carried out by the combustion gas temperature control section 18. When the combustion gas temperature TX3 is maintained constant during the increase of the generator output MW from the time point t2 to the time point t3, the exhaust gas temperature TX4 decreases linearly as shown.

FIG. 7 shows the characteristics of the function generators 32 and 41. The function generator 32 generates the normal limit value TXR4a shown in broken line, as a function of the compressor pressure ratio PX2/PX1. Controlling the exhaust gas temperature TX4 at or below the normal limit value TXR4a by means of the combustion gas temperature control unit, is equivalent to maintaining the combustion gas temperature TX3 at or below the predetermined limit value TXR3a as shown in FIG. 6. The function generator 41 generates the emergency limit value TXR4b shown in broken line, as a function of the compressor pressure ratio PX2/PX1. In the normal state of combustion gas temperature control, the combustion gas temperature is limited at or below the normal limit value TXR3a because of the limitation by the limit value TXR4a, so that the generator output MW cannot be increased beyond the time point t3. While when the system abnormality sensor 39 is in operation, the switch 42 is changed over to the side of the function generator 41 to bring the system into the state of the emergency combustion gas temperature control with the emergency limit value TXR4b, so that the combustion gas temperature can be increased to TXR3b and the generator output MW can be increased to the time point t4 to make it easy to restore the system frequency.

The inlet guide blades or vanes 1 used in this embodiment are set to take the maximum angle when the generator output MW is at the time point t3, and the inlet guide blades or vanes 1 maintain the maximum angle while the generator output MW increases from the time point t3 to the time point t4. Therefore, the compressor air flow rate GAX is maintained constant during the generator output increase from the time point t3 to the time point t4, as indicated in FIG. 5.

Figure 8:
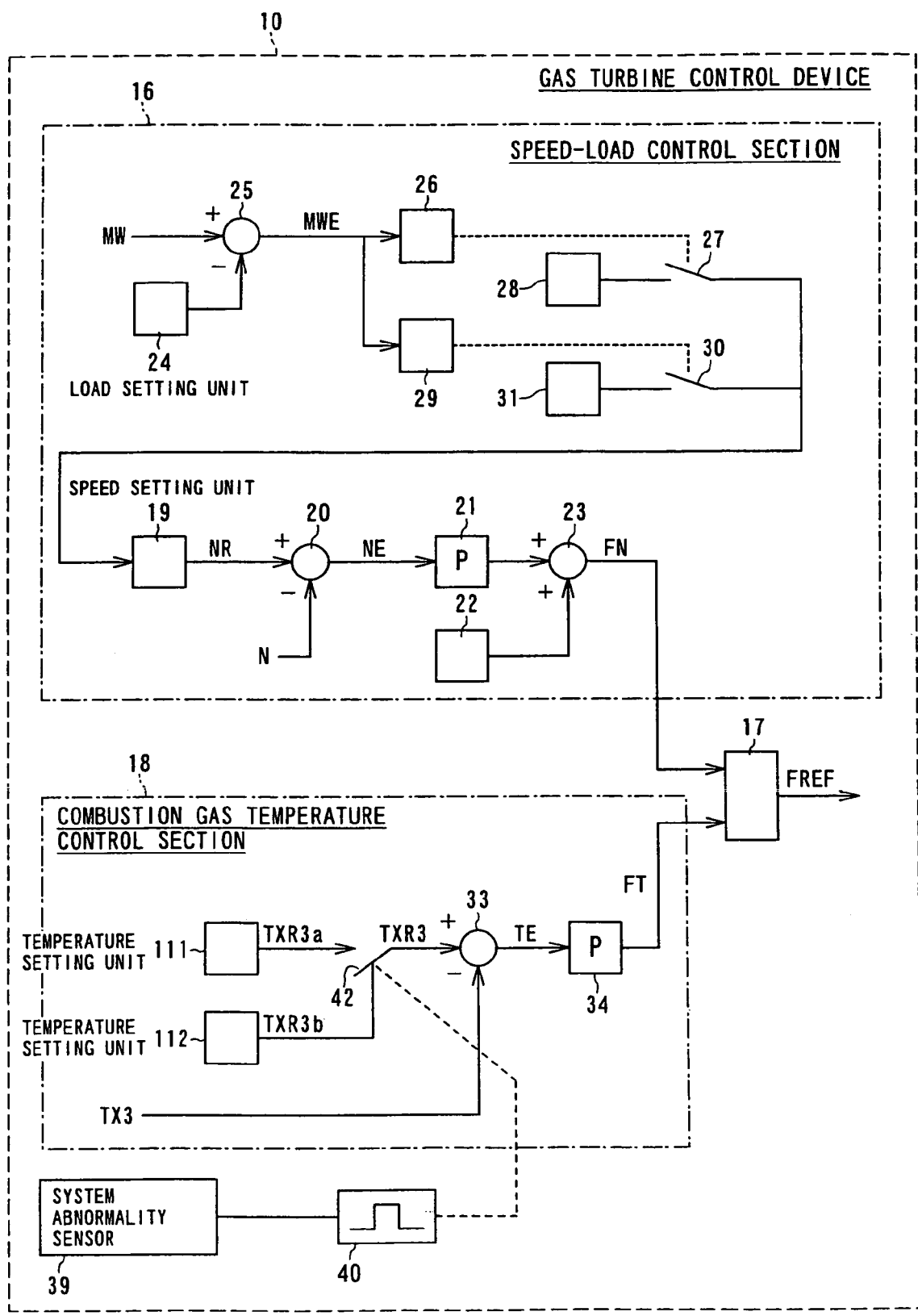
FIG. 8 is a block diagram showing a fourth embodiment of the invention.

FIG. 8 shows a fourth embodiment of the invention. In the gas turbine control system 10 according to this embodiment, the fuel gas temperature control section 18 has a temperature setting unit 111, another temperature setting unit 112, a switch 42, a subtracter 33, and a proportional integrator 34 associated as shown. The temperature setting unit 111 generates a normal upper limit value TXR3a and the temperature setting unit 112 generates an emergency upper limit value TXR3b. When the system abnormality sensor 39 is not in operation, the switch 42 is changed over to the temperature setting unit 111, while when the system abnormality sensor 39 is in operation, the switch 42 is changed over to the temperature setting unit 112. When the system abnormality sensor 39 operates, the timer 40 begins to operate for a set period of time, and upon elapse of the set time the timer 40 interrupts the signal from the sensor 39 and changes over the switch 42 to the side of the temperature setting unit 111. The subtracter 33 receives the limit value TXR3 from the temperature setting unit 111 or 112 as well as the combustion gas temperature TX3 and outputs a temperature deviation TE, which is supplied to the proportional integrator 34 from which the combustion gas temperature control signal FT is output and sent to the fuel control signal selection unit 17. In this embodiment of the invention, the combustion gas temperature TX3 is detected rather than the exhaust gas temperature TX4 for the fuel control, the response in the control operation is quick.

Figure 9:
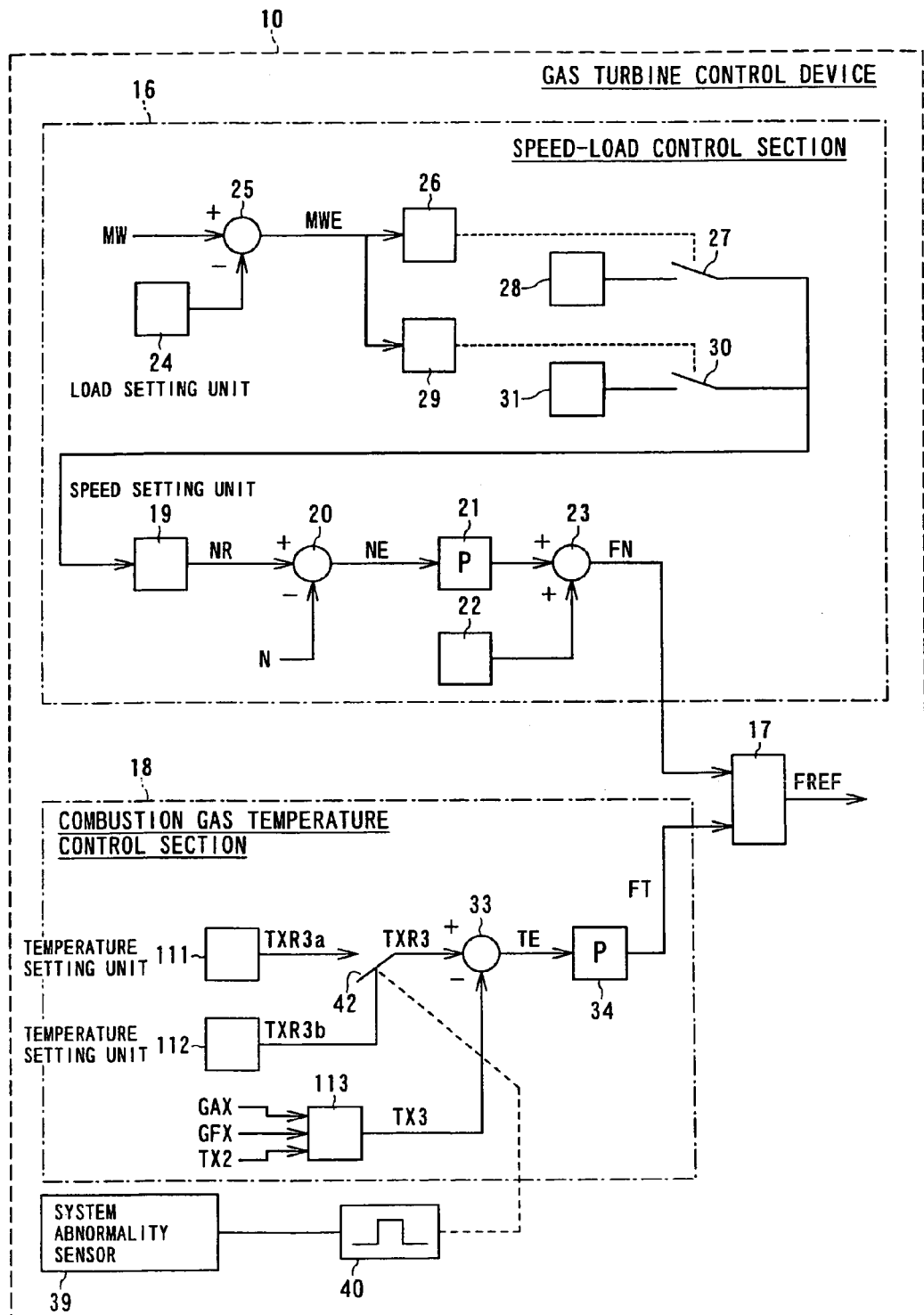
FIG. 9 is a block diagram showing a fifth embodiment of the invention.

FIG. 9 shows a fifth embodiment of the invention. In the gas turbine control system 10 according to this embodiment, the fuel gas temperature control section 18 has a temperature setting unit 111, another temperature setting unit 112, a switch 42, a subtracter 33, and a proportional integrator 34 associated as shown. The temperature setting unit 111 generates a normal upper limit value TXR3a and the temperature setting unit 112 generates an emergency upper limit value TXR3b. When the system abnormality sensor 39 is not in operation, the switch 42 is changed over to the temperature setting unit 111, while when the system abnormality sensor 39 is in operation, the switch 42 is changed over to the temperature setting unit 112. When the system abnormality sensor 39 operates, the timer 40 begins to operate for a set period of time, and, upon elapse of the set time, the timer 40 interrupts the signal from the sensor 39 and changes over the switch 42 to the side of the temperature setting unit 111. The foregoing is the same as the embodiment of FIG. 8. In this fifth embodiment an arithmetic unit (a calculator) 113 is provided. To this arithmetic unit 113 are input the compressor air flow rate GAX, a compressor outlet air temperature TX2 and a fuel flow rate GFX. The arithmetic unit 113 calculates a combustion gas temperature TX3, using the following formula.

$$TX3 = TX2 + Q*GFX/(GAX*Cp)$$

where Cp is specific heat of air, and Q is quantity of heat generated from the fuel.

The subtracter 33 receives the limit value TXR3 from the temperature setting unit 111 or 112 as well as the combustion gas temperature TX3 from the arithmetic unit 113. The subtracter. 33 outputs a temperature deviation TE, which is supplied to the proportional integrator 34 from which the combustion gas temperature control signal FT is output and sent to the fuel control signal selection unit 17. In this fifth embodiment, since the combustion gas temperature is not detected directly, but is calculated based on other detected values, both reliability of the detection of temperature and response in control are high.

Figure 10:
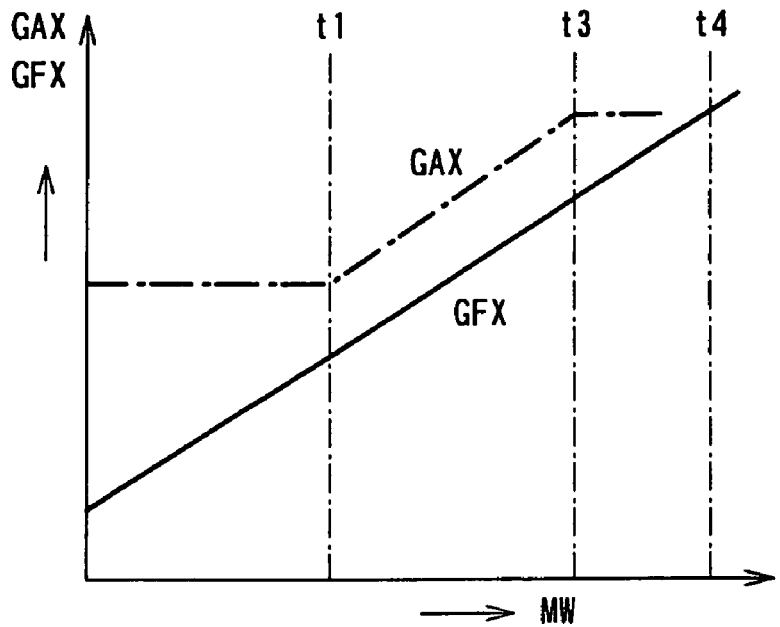
FIG. 10 is a graph showing quantitative changes (compressor air flow rate, etc.) of the state of a gas turbine unit used in the fourth and fifth embodiments of the invention.
Figure 11:
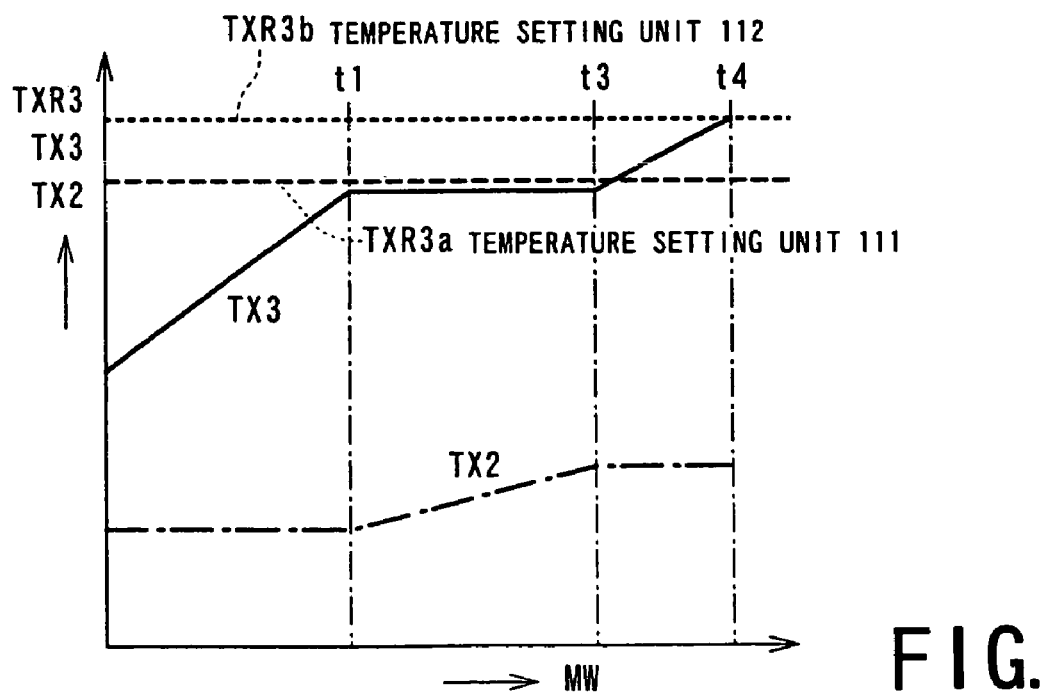
FIG. 11 is a graph showing quantitative changes (combustion gas temperature, etc.) of the state of a gas turbine unit used in the fourth and fifth embodiments of the invention.

FIGS. 10 and 11 show quantitative changes in the state, of the gas turbine unit 100 using the gas turbine control system 10 shown in FIGS. 8 and 9. As shown in FIG. 10, as the generator output MW increases, the fuel flow rate GFX increases in proportion to the generator output MW. Until the generator output MW reaches the time point t1, the angle of the inlet guide vanes 1 is maintained constant by means of the inlet guide vane drive device 101, to thereby maintain the compressor air flow rate GAX constant. As the generator output MW increases from the time point t1 to the time point t3, the angle of the inlet guide vanes 1 is increased gradually by the inlet guide vane drive device 101 to thereby increase the compressor air flow rate GAX as shown.

As shown in FIG. 11, as the generator output MW increases, the combustion gas temperature TX3 increases, and when the generator output MW reaches the time point t1, the combustion gas temperature TX3 increases to the normal limit value TXR3a shown by broken line. Even when the generator output MW increases from the time point t1 to the time point t3, the combustion gas temperature TX3 is maintained at or below the normal limit value TXR3a because the angle of the inlet guide blades or vanes 1 is increased by the inlet guide blades or vanes drive device 101 to increase the compressor air flow rate GAX and because the fuel supply is controlled by the combustion gas temperature control section 18. The temperature generator 111 generates the normal limit value TXR3a and the temperature generator 112 generates the emergency limit value TXR3b. Since the combustion gas temperature TX3 is limited at or below the normal limit value TXR3a in the normal combustion gas temperature control mode, the generator output cannot be increased beyond the time point t3. When the system abnormality sensor 39 operates, the switch 42 is changed over to the side of the temperature generator 112 for switching to the emergency combustion gas temperature control mode, whereby the limit value is changed to the emergency limit value TXR3b to allow the combustion gas temperature to increase up to TXR3b. Therefore, it becomes possible to increase the generator output to the time point t4, so that the system frequency can be restored easily.

The inlet guide blades or vanes 1 are designed to take the maximum angle when the generator output MW is at the time point t3 and to maintain the angle constant during increase of the generator output MW from the time point t3 to the time point t4. For this reason, the compressor air flow rate GAX is maintained constant as shown in FIG. 10 during the increase of the generator output MW from the time point t3 to the time point t4.

Figure 12:
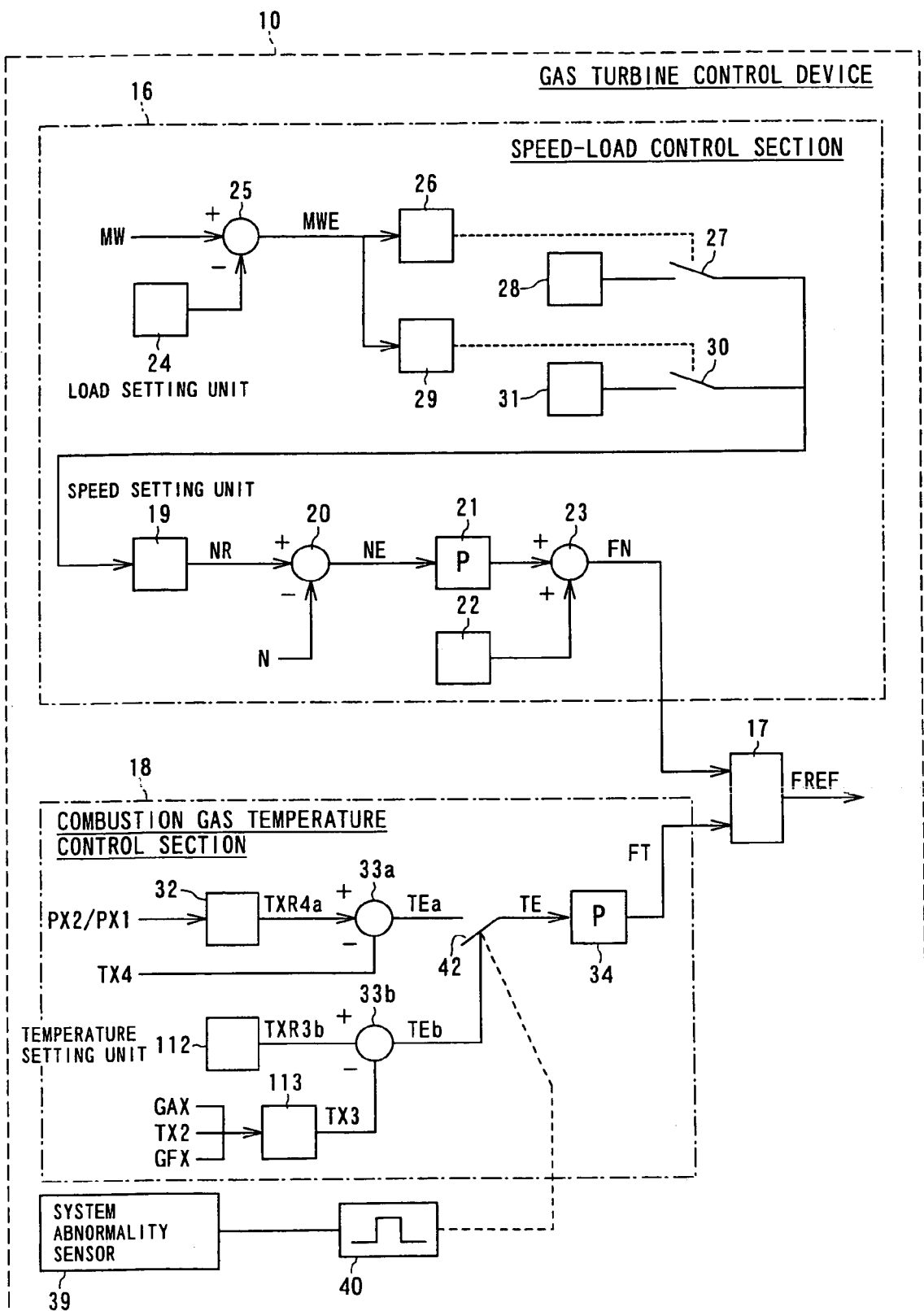
FIG. 12 is a block diagram showing a sixth embodiment of the invention.

FIG. 12 shows a sixth embodiment of the gas turbine control system 10 of the invention. As shown, the fuel gas temperature control section 18 has a function generator 32, a subtracter 33a, a temperature setting unit 112, a calculator 113, a subtracter 33b, a switch 42, and a proportional integrator 34. To the function generator 32 are input the compressor inlet air pressure PX1 and the compressor outlet air pressure PX2. The function generator 32 outputs the normal limit value TXR4a as a function of the pressure ratio PX2/PX1. The normal limit value TXR4a from the function generator 32 and the exhaust gas temperature TX4 are input to the subtracter 33a, which outputs the temperature deviation TEa. The temperature setting unit 112 generates the emergency limit value TXR3b. The calculator 113 calculates the combustion gas temperature TX3 on the basis of the compressor air flow rate GAX, the compressor outlet air temperature TX2 and the fuel flow rate CFX. To the subtracter 33b are input the emergency limit value TXR3b from the temperature setting unit 112 and the combustion gas temperature TX3 from the calculator 113. The subtracter 33b outputs a temperature deviation TEb.

When the system abnormality sensor 39 is not in operation, the switch 42 is connected to the subtracter 33a, while when the system abnormality sensor 39 is in operation, the switch 42 is connected to the subtracter 33b. The timer 40 operates to interrupt the signal from the system abnormality sensor 39 upon elapse of a predetermined length of time after the system abnormality sensor 39 is operated, whereupon the timer 40 connects the switch 42 to the side of the subtracter 33a. The temperature deviation TEa from the subtracter 33a or the temperature deviation TEb from the subtracter 33b is input to the proportional integrator 34, which outputs the combustion gas temperature control signal FT, which is input to the fuel control signal selection unit 17. In this embodiment, a high reliability in temperature detection is obtained since the exhaust gas temperature is used for the normal combustion gas temperature control, and a high response in control is obtained since the combustion gas temperature is used for the emergency combustion gas temperature control.

Figure 13:
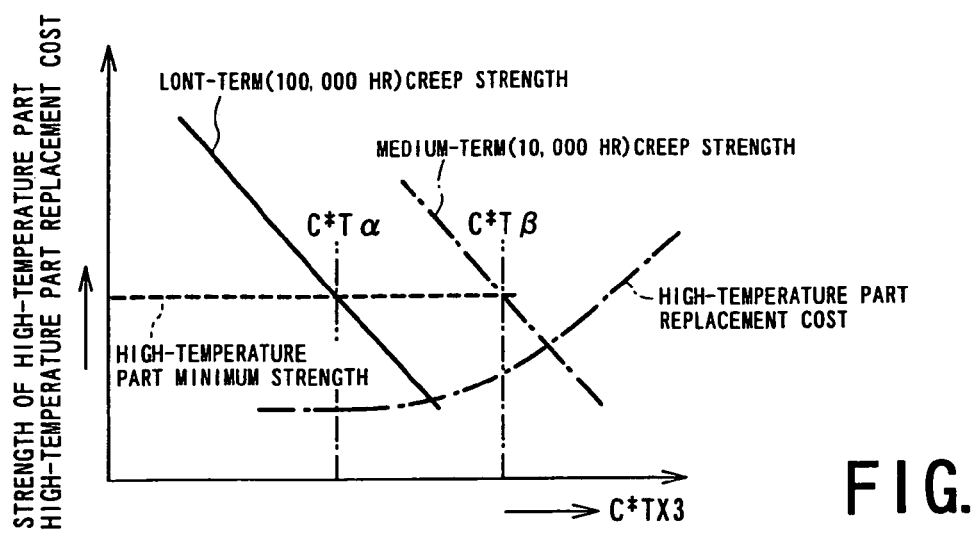
FIG. 13 is a graph explaining how to determine a normal limit value in a seventh embodiment of the invention, the graph showing a relationship between combustion gas temperature and creep strength of a material used for hot gas path parts constituting the gas turbine.

How to determine the normal limit value TXR3 in the normal combustion gas temperature control will be described with reference to FIGS. 13, 14 and 15, which relate to a seventh embodiment of the invention. FIG. 13 illustrates a relationship between the combustion gas temperature TX3 and the creep strength of a material used for hot gas path parts of the gas turbine. Since the temperature of the hot gas path parts increases and decreases in proportion to the combustion gas temperature, a proportional constant in temperature variation is designated as C in the figure. As the combustion gas temperature increases, the creep strength of the material decreases. In order to prevent damage to the hot gas path parts, the combustion gas temperature must be so limited that the maximum stress generated in the hot gas path parts is maintained at or below the creep strength of the material.

In FIG. 13, the upper limit of the combustion gas temperature is shown in solid line in the case that the 100,000-hour creep strength is used as a limit strength, and the upper limit of the combustion gas temperature is shown in one-dot chain line in the case that the 10,000-hour creep strength is used as a limit strength. In the case in which the 100,000-hour creep strength is used as the limit strength, the hot gas path parts are replaced after 100,000-hour gas turbine operation, while in the case in which the 10,000-hour creep strength is used as the limit strength, the hot gas path parts must be replaced after each 10,000-hour gas turbine operation, which entails an increased cost for replacing the hot gas path parts. FIG. 13 also shows the combustion gas temperature as well as an average replacement cost of the hot gas path parts through the year.

Figure 14:
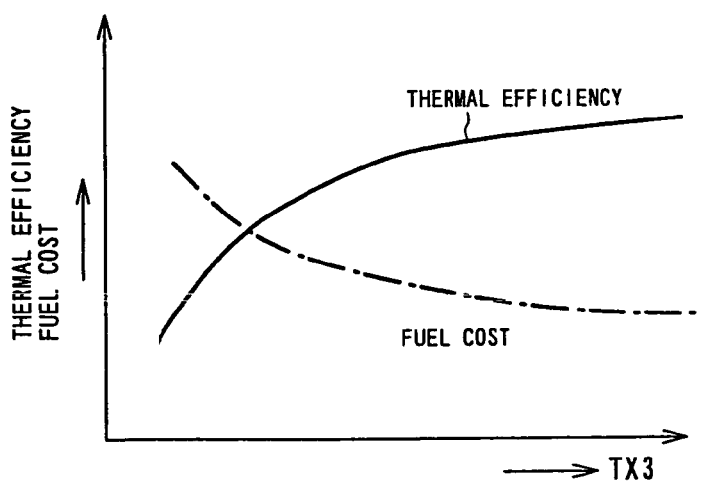
FIG. 14 is a graph explaining how to determine a normal limit value in the seventh embodiment of the invention, the graph showing a relationship of combustion gas temperature, gas turbine efficiency and average fuel cost through a year.
Figure 15:
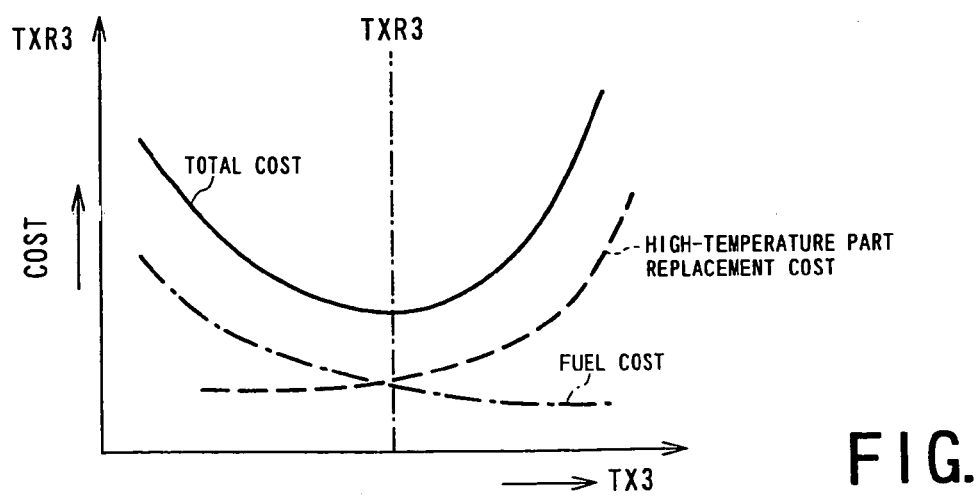
FIG. 15 is a graph explaining how to determine a normal limit value in the seventh embodiment of the invention, the graph showing a relationship of combustion gas temperature, hot gas path part replacement cost and fuel cost.

FIG. 14 shows a relationship between the combustion gas temperature TX3 and the gas turbine efficiency and a relationship between the combustion gas temperature TX3 and the average fuel cost throughout the year. It will be noted that as the combustion gas temperature TX3 increases, the gas turbine efficiency increases as shown in solid line so that the fuel cost decreases as shown in one-dot chain line. FIG. 15 shows a relationship between the combustion gas temperature TX3 and the hot gas path part replacement cost (in broken line) and a relationship between the combustion gas temperature TX3 and the fuel cost (in one-dot chain line). The normal limit value TXR3 is determined as a combustion gas temperature at which the sum of the hot gas path part replacement cost (in broken line) and the fuel cost (in one-dot chain line) takes a minimum value. By determining the limit value of the combustion gas temperature as above, the gas turbine can be operated most economically for a long term.

Figure 16:
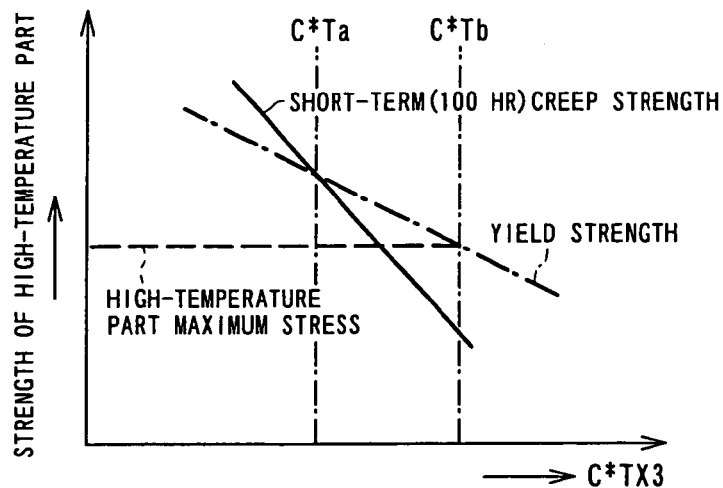
FIG. 16 is a graph explaining how to determine a normal limit value in an eighth embodiment of the invention, the graph showing a relationship of combustion gas temperature and a short-term strength of a material used for hot gas path parts constituting the gas turbine.

How to determine the emergency limit value TXR3$b$ in the emergency combustion gas temperature control will be described with reference to FIG. 16, which relate to an eighth embodiment of the invention. Since the period of time in which the electric power system operates in an abnormal condition is generally short, the emergency limit value TXR3$b$ is determined in consideration of the short-term strength of the material forming the gas turbine hot gas path parts and the surging limit of the compressor. FIG. 16 shows a relationship between the combustion gas temperature TX3 and the short-term strength of the material forming the gas turbine hot gas path parts. Representing the short-term strength, a short-term creep strength and an yield strength are shown in solid line and one-dot chain line, respectively. It will be noted that the short-term strength decreases as the combustion gas temperature TX3 increases. In order to prevent damage to the hot gas path parts, the combustion gas temperature must be so limited that the maximum stress produced in the hot gas path parts is below the short-term strength. An upper limit value determined from the short-term creep strength (100-hour creep strength) is designated by Ta, and an upper limit value determined from the yield strength is designated by Tb. In many cases, a heat resistant coating is often applied to the surfaces of the gas turbine hot gas path parts. If the heat resistant coating is heated to a temperature above the upper limit value, it is sintered so that not only its heat-resisting function deteriorates but also the coating is removed from the surfaces of the hot gas path parts. Another upper limit value Tc is determined in consideration of the heat resistant coating. When the combustion gas temperature increases, the pressure ratio PX2/PX1 of the compressor changes in accordance with the following expression.

$$PX2/PX1 = K * GAX(TX3)^{1/2}$$

where K is a proportional constant.

As is well known in the art, surging is produced when the pressure ratio of the compressor increases excessively, with a resultant possibility of destroying the compressor. This must be prevented. A further upper limit value Td is determined in consideration of a surging limit of the compressor. The emergency temperature limit value TXR3$b$ is determined, using the following expression.

$$TXR3b = \min. (Ta, Tb, Tc, Td)$$

By determining the emergency temperature limit value TXR3$b$ as above, the hot gas path parts can be free from any trouble and can avoid compressor surging, even when the gas turbine is operated under the emergency combustion gas temperature control.

Figure 17:
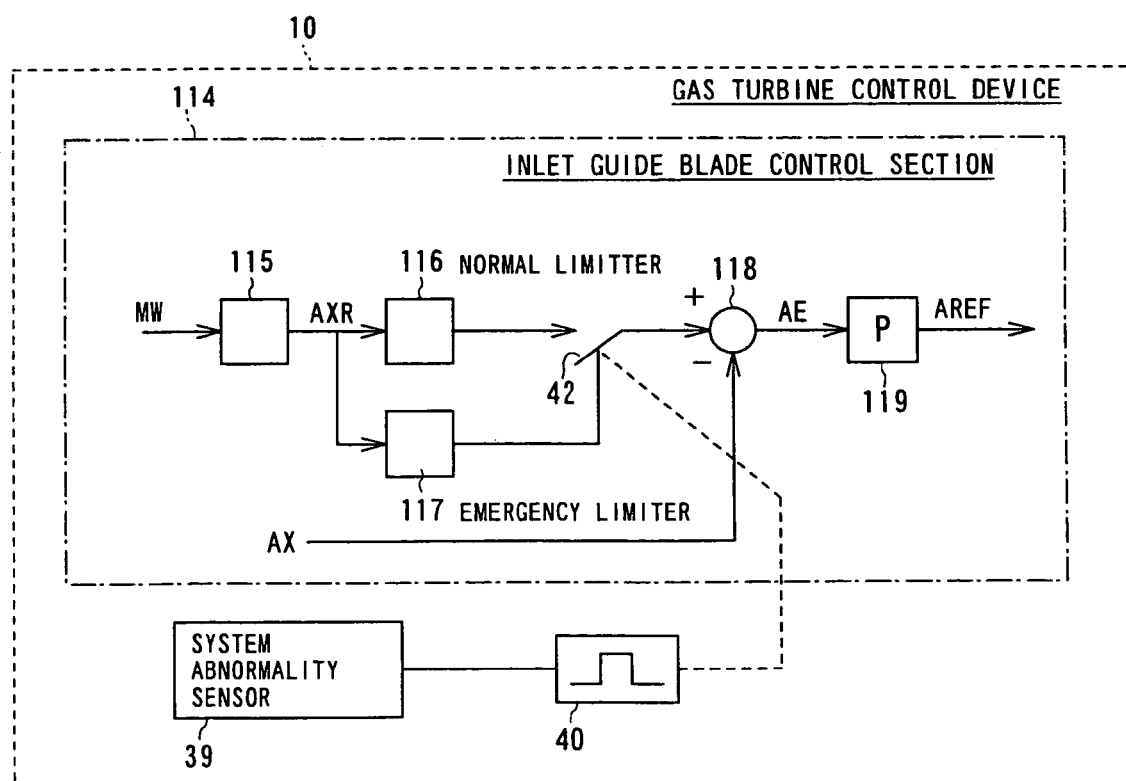
FIG. 17 is a block diagram showing a ninth embodiment of the invention.

FIG. 17 shows a ninth embodiment of the gas turbine control system of the invention. In this embodiment, an inlet guide vanes control section 114 includes a function generator 115, a normal limiter 116, an emergency limiter 117, a subtracter 118, a switch 42 and a proportional integrator 119, which are associated as shown. The generator output MW is input to the function generator 115, which outputs an inlet guide vane angle control value AXR as a function of the generator output MW. The inlet guide vane angle control value AXR is input to either the normal limiter 116 or the emergency limiter 117. The normal limiter 116 operates to limit the inlet guide vane angle control value AXR to an upper limit value AXRa, and the emergency limiter 117 operates to limit the inlet guide vane angle control value AXR to an upper limit value AXRb.

When the system abnormality sensor 39 is not in operation, the switch 42 is connected to the side of the normal limiter 116, while when the system abnormality sensor 39 is in operation, the switch 42 is changed over to the side of the emergency limiter 117. The timer 40 begins to operate for a set period of time, and, upon elapse of the set time, the timer 40 interrupts the signal from the sensor 39 and changes over the switch 42 to the side of the normal limiter 116. The subtracter 118 receives the signal of the inlet guide vane angle control value AXR from either the normal limiter 116 or the emergency 117, and the subtracter 118 outputs a signal of angle deviation AE, which is input to the proportional integrator 119, which in turn outputs an inlet guide vane angle control signal AREF to control the angle of the inlet guide vanes.

Figure 18:
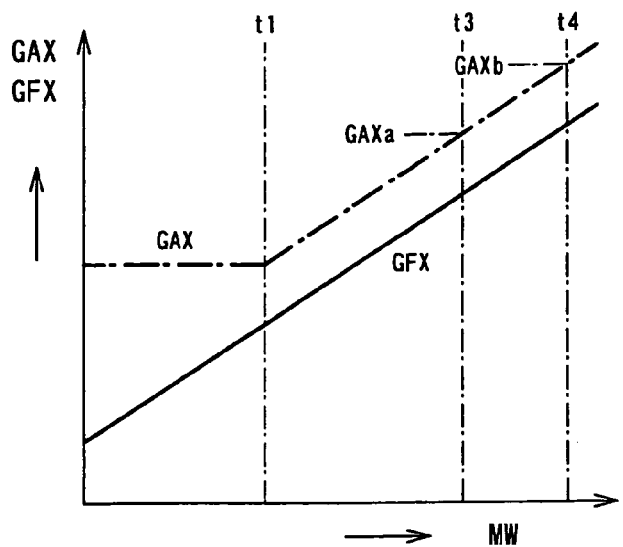
FIG. 18 is a graph showing quantitative changes (compressor air flow rate, etc.) of the state of a gas turbine unit used in the ninth embodiment of the invention.
Figure 19:
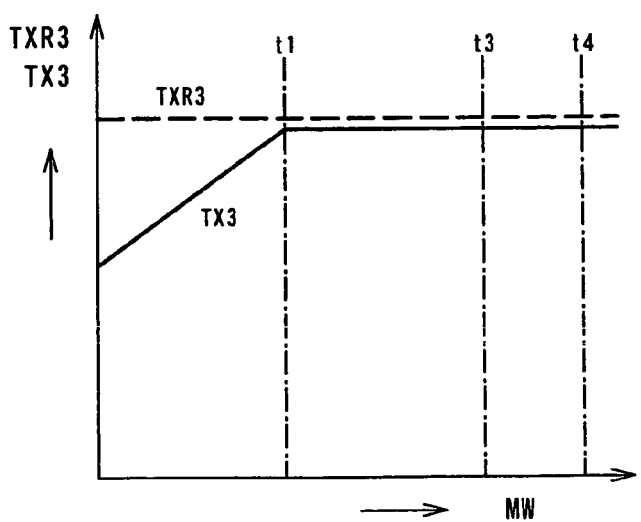
FIG. 19 is a graph showing quantitative changes (combustion gas temperature, etc.) of the state of a gas turbine unit used in the ninth embodiment of the invention.

FIGS. 18 and 19 show quantitative changes of the state of the gas turbine unit controlled by the gas turbine control system 10 shown in FIG. 17. As shown in FIG. 18, the fuel flow rate GFX increases in proportion to the generator output MW, as the generator output MW increases. The compressor air flow GAX is maintained constant by maintaining the angle of the inlet guide vanes 1 unchanged by means of the inlet guide vane control section 114, until the generator output MW reaches the time point t1. As the generator output MW increases from the time point t1 to the time point t3, the angle of the inlet guide vanes 1 is gradually increased by means of the inlet guide vane control section 114, and the compressor air flow GAX is thereby increased as shown.

As shown in FIG. 19, the combustion gas temperature TX3 increases as the generator output MW increases, and when the generator output MW reaches the time point t1, the combustion gas temperature TX3 increases up to the upper limit value TXR3. Even when the generator output MW increases from the time point t1 to the time point t3, the combustion gas temperature TX3 is maintained at or below the upper limit value TXR3, because the compressor air flow rate GAX is increased by the function of the inlet guide vane control section 114 increasing the angle of the inlet guide vanes and because of the fuel control carried out by the combustion gas temperature control section 18. In the normal inlet guide vane control mode, the angle of the inlet guide vanes 1 is limited at or below an upper limit value AXRa by means of the normal limiter 116, and consequently the compressor air flow rate is limited at or below GAXa, so that the generator output MW cannot increase beyond the time point t3. When the system abnormality sensor 39 is operated, the switch 42 is changed over to the side of the emergency limiter 117 so that the system takes an emergency inlet guide vane control mode in which the upper limit value of the inlet guide vane angle is raised from the upper limit value AXRa to an upper limit value AXRb. In this control mode, the compressor air flow rate can be increased to GAXb shown in FIG. 18 so that the generator output can be increased to the time point t4, whereby the system frequency can be restored easily. In this embodiment of the invention, even if the fuel flow rate GFX is increased as shown in FIG. 18 to increase the generator output MW from the time point t3 to the time point t4, the combustion gas temperature TX3 is maintained at or below the upper limit value TXR3 as indicated in FIG. 19 because the compressor air flow rate GAX increases.

Figure 20:
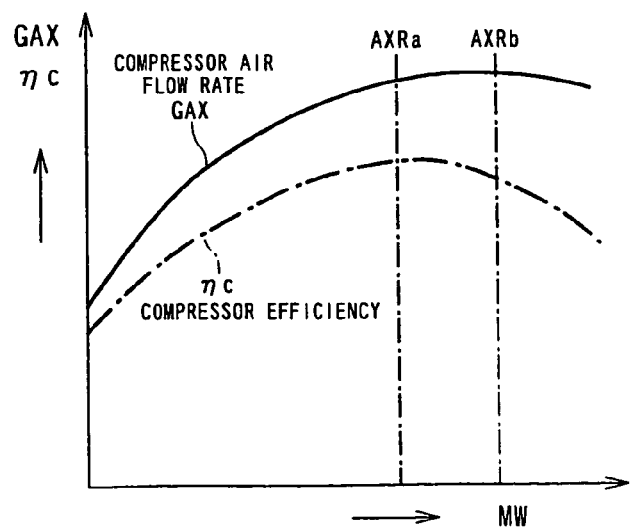
FIG. 20 is a graph explaining how to determine a normal limiter and an uppermost value of an emergency limiter in the ninth embodiment of the invention.

How the upper limit value AXRa of the normal limiter 116 and the upper limit value AXRb of the emergency limiter 117 are determined will be explained with reference to FIG. 20, which shows the relationship between the inlet guide vane angle AX and the compressor air flow rate GAX and between the inlet guide blade angle AX and the compressor efficiency ηc. According to the invention, an inlet guide blade angle at which the compressor efficiency ηc takes the maximum value is made the upper limit value AXRa of the normal limiter 116. By determining this upper limit value AXRa, the compressor can be operated at the maximum efficiency in normal state. Further, according to the invention, an inlet guide blade angle at which the compressor air flow rate GAX takes the maximum value is made the upper limit value AXRb of the emergency limiter 117. By determining this upper limit value AXRb, it becomes possible to increase the generator output MW and hence the gas turbine output by increasing the compressor air flow rate GAX, when abnormality occurs in the system frequency, whereby gas turbine control for restoring the system frequency can be carried out easily.

A tenth embodiment of the invention will be described with reference to FIG. 21. The same reference characters used in FIG. 37 showing the prior art, are applied to the same or equivalent elements and description will be dispensed with. This tenth embodiment is provided additionally with a variation rate limiter 43 and a switch 44, as well as the system abnormality sensor 39 and the timer 40. When the system abnormality sensor 39 operates, the switch 44 is opened as shown and the speed-load control signal FN is input to the fuel control signal selection unit 17 via the variation rate limiter 43. Upon elapse of the time set in the timer 40, which is the length of time within which the system frequency is expected to recover, the switch 44 is closed and the variation rate limiter 43 is by-passed.

Figure 21:
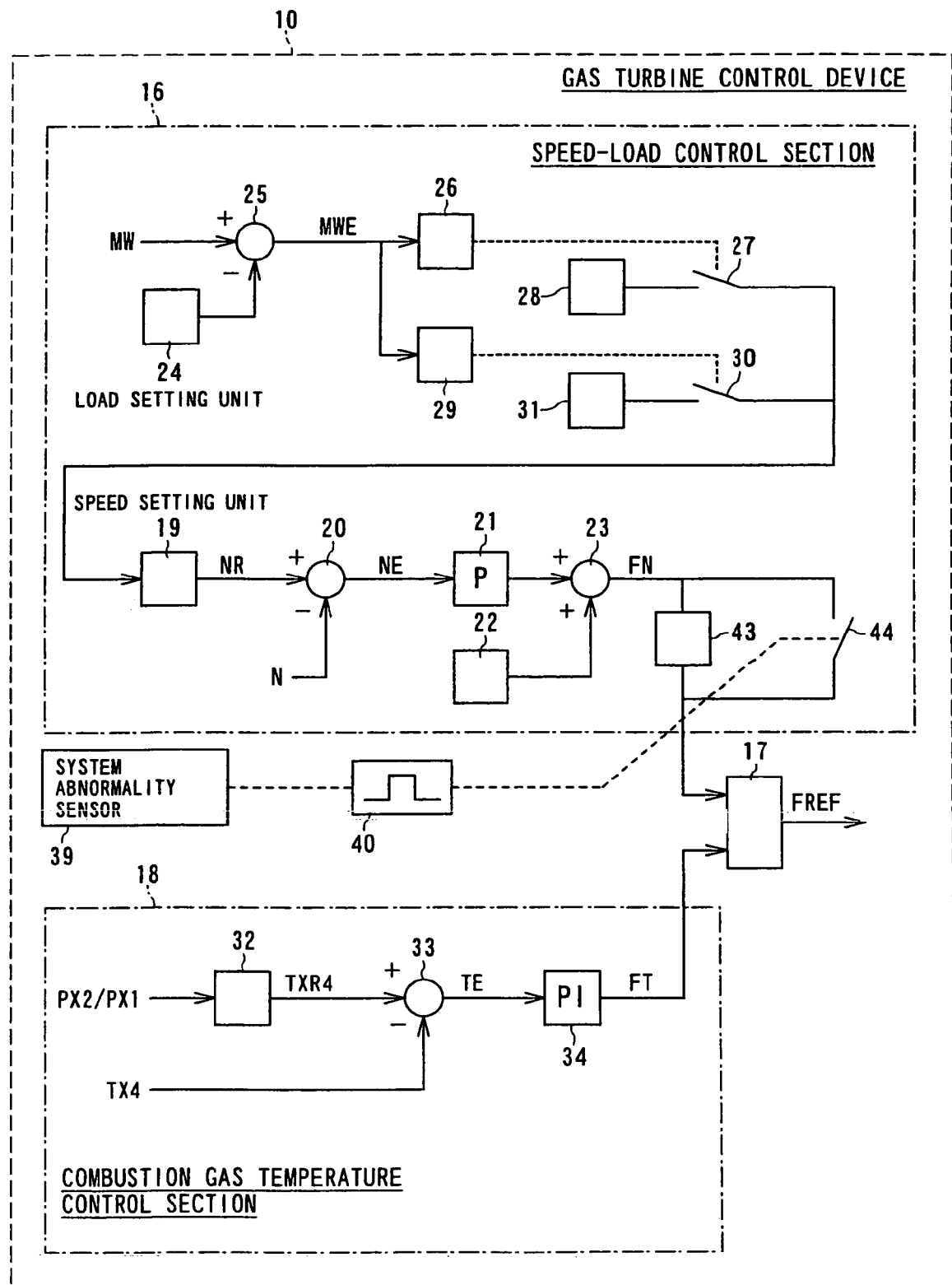
FIG. 21 is a block diagram showing a tenth embodiment of the invention.

FIG. 21 shows that the system abnormality sensor 39 operates when the system frequency changes out of a predetermined range in which the electric power system operates normally. For example, the system abnormality sensor 39 operates when the system frequency increases above a predetermined value, or when the system frequency decreases below a predetermined value. If the system frequency f and hence the gas turbine speed change, the speed-load control signal FN is changed accordingly by an amount proportional to the speed change that has occurred. This change brings about a change in the fuel flow rate and a change in the compressor air flow rate, so that the ratio of the fuel flow rate to the combustion air flow rate is changed, which causes changes in the combustion gas temperature TX3 and the gas turbine exhaust gas temperature TX4. In the case where the system frequency f changes in decreasing direction, a change of the speed-load control signal FN in increasing direction, i.e. a change in the fuel flow rate in increasing direction, is limited by the exhaust gas temperature control signal FT so that switching occurs to control the fuel flow rate by the exhaust gas temperature control signal FT.

Thus, if a rapid and large change in the fuel flow rate is given while the system abnormality sensor 39 is operated, an exhaust gas temperature change occurs with a delay from the fuel flow rate change so that the exhaust gas temperature TX4 may temporarily exceed the alarm issuing value or the limit value for protectional purposes, thus leading to a possibility of gas turbine trip. The variation rate limiter 43 is provided to prevent occurrence of the above situation. The variation rate limiter 43 operates to limit the variation rate of the fuel flow control signal FREF, i.e. the variation rate of the fuel flow rate. Contrary to the above, in the case in which the system frequency f changes in increasing direction, the value of the ratio of the fuel flow rate to the combustion air flow rate decreases. This means that the fuel flow rate decreases. A rapid decrease of the fuel flow rate may cause loss of flame in the gas turbine. In order to prevent this, it is effective to limit the variation rate of the fuel flow control signal FREF, i.e. the variation rate of the fuel flow rate.

With the tenth embodiment of the invention, it is possible to suppress excessive variations of the fuel flow rate, the combustion gas temperature and the exhaust gas temperature, whereby trip accidents due to excessively high gas temperature and loss of flame in the combuster can be prevented. Further, after elapse of a predetermined time within which the system frequency is expected to recover, the timer becomes OFF and the gas turbine control system returns to the normal control operation.

Figure 22:
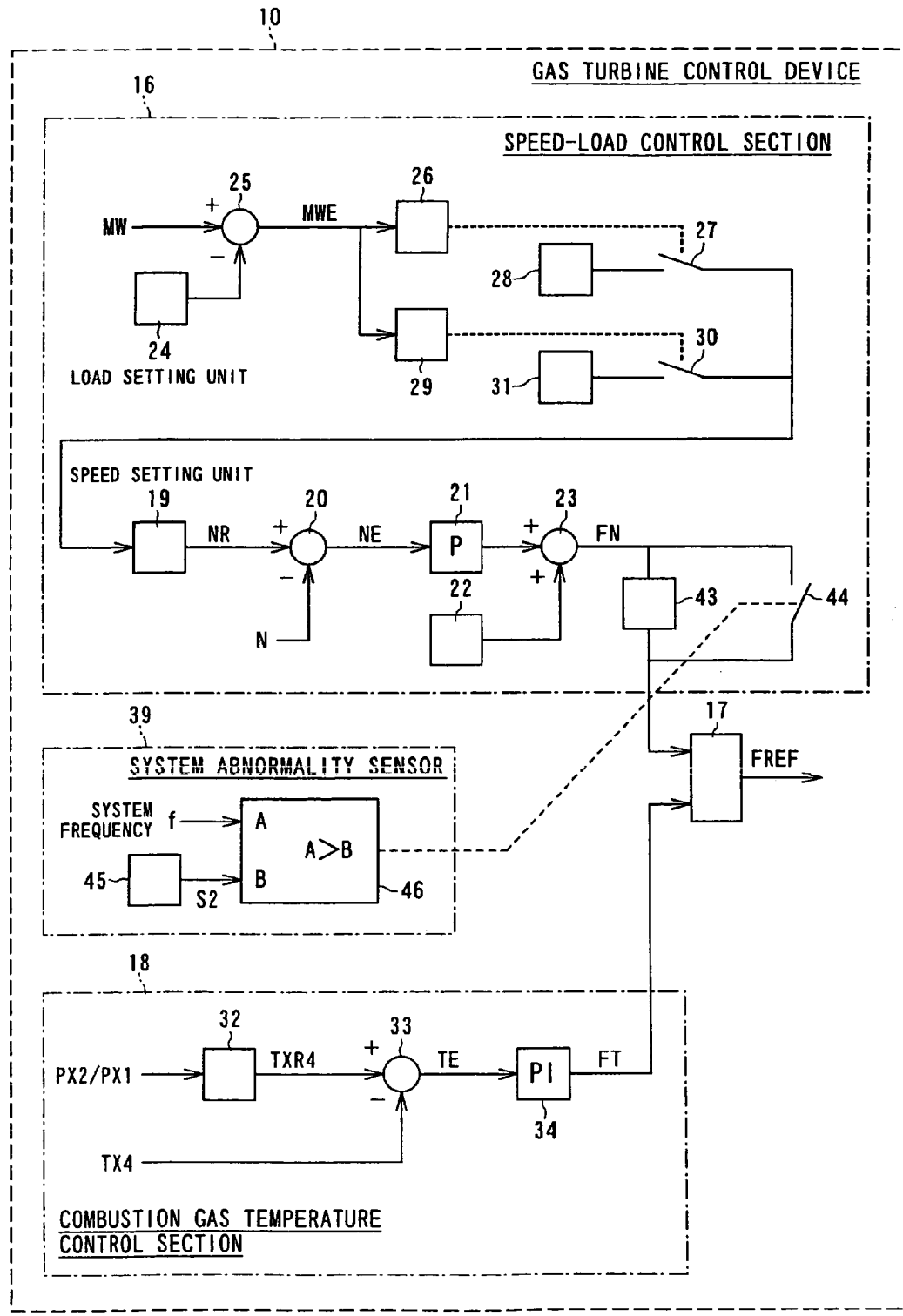
FIG. 22 is a block diagram showing an eleventh embodiment of the invention.

FIG. 22 shows an eleventh embodiment of the invention. The same reference characters used in FIG. 37 showing the prior art, are applied to the same or equivalent elements and description will be dispensed with. This eleventh embodiment is provided additionally with a system abnormality sensor 39 that includes a signal generator 45 giving a predetermined system frequency setting value S2, and a comparator 46, a switch 44 that opens the circuit as shown when an output signal system is given thereto from the abnormality sensor 39 and a variation rate limiter 43. When a system frequency change occurs beyond a predetermined range in which the electric power system operates normally, for example, when the system frequency f becomes higher than the predetermined system frequency setting value S2 in FIG. 22, the speed-load control signal FN decreases rapidly in response to detection of a system frequency abnormality in the prior art, which throttles the fuel flow rate and may leads to loss of flame in the combuster.

In the eleventh embodiment of the invention shown in FIG. 22, when the system abnormality sensor 39 operates and issues an output signal, the switch 42 is opened so that the speed-load control signal FN is input to the fuel control signal selection unit 17 through the variation rate limiter 43, which operates to limit a large variation rate of the fuel flow rate to prevent loss of flame in the combuster 4. In such a case, the system frequency f is high, i.e. the gas turbine speed N is high, so that the compressor air flow rate increases, whereas the fuel flow rate is being controlled toward reduction. As a result, the ratio of the fuel flow rate to the combustion air flow rate becomes small, which means that the flame in the combuster 4 is apt to be blown out compared with the normal operation. It will be noted that the variation rate limiter 43 is effective to prevent loss of flame in the case of transitional abrupt change toward reduction of the fuel flow rate. When the system frequency f restores, the switch 44 is closed and the variation rate limiter 43 is by-passed whereby the speed-load control section 16 returns to its normal state.

Figure 23:
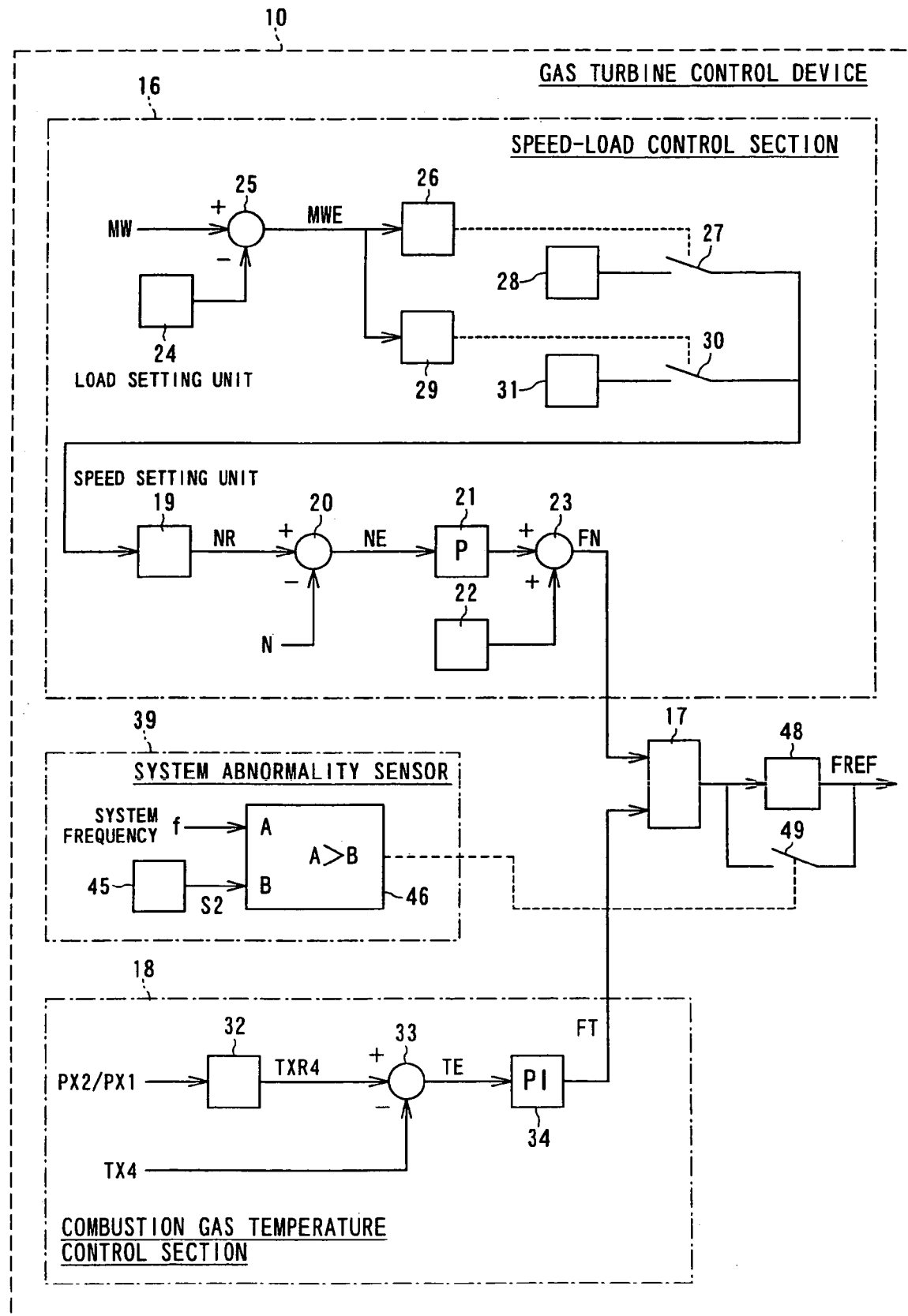
FIG. 23 is a block diagram showing a twelfth embodiment of the invention.

A twelfth embodiment of the invention will be described with reference to FIG. 23. The embodiment of FIG. 23 differs from the embodiment of FIG. 22 in that in the former a variation rate limiter 48 and a changeover switch 49 are provided to perform a limiting function to the fuel control signal FREF in contrast to the latter in which the variation rate limiter 43 and the switch 44 are provided to perform the limiting function to the speed-load control signal FN. It will be noted that the only difference between the embodiments of FIG. 22 and FIG. 23 lies in the location where the variation rate limiter and the switch are provided. The eleventh and twelfth embodiments are the same in that they have the same function to prevent loss of flame in the combuster 4 by suppressing large variation rate of the fuel flow rate.

The fuel control system has means to switch over or change the control constant. The means to change the control constant in the fuel control signal may be provided in the speed-load control section or in a downstream fuel control section.

Figure 24:
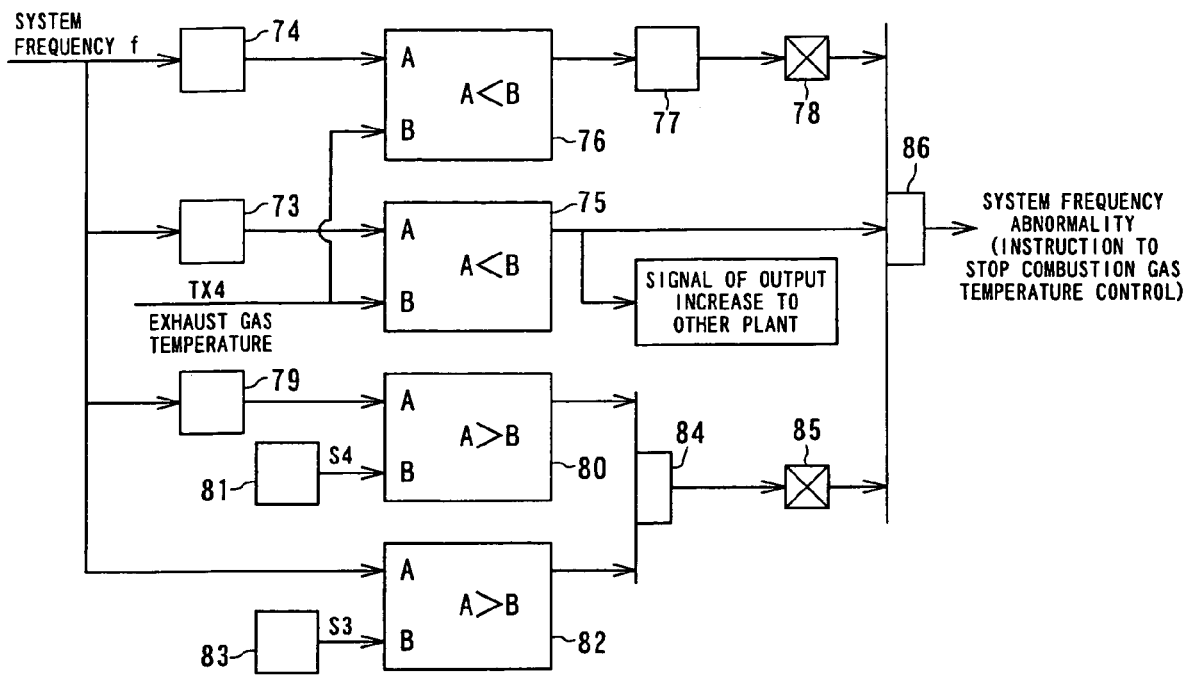
FIG. 24 is a block diagram showing a thirteenth embodiment of the invention.
Figure 25:
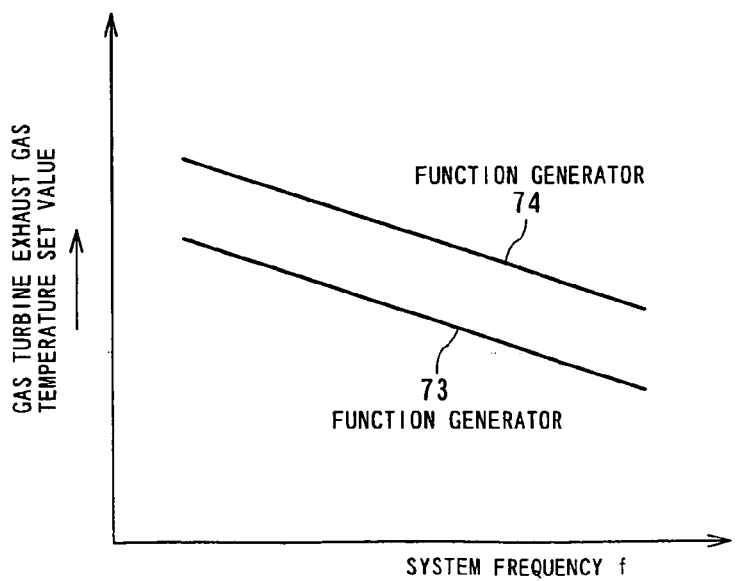
FIG. 25 is a graph showing characteristics of a function generator for calculating a set value of exhaust gas temperature corresponding to the system frequency, in the thirteenth embodiment of the invention.

A thirteenth embodiment of the invention will be described with reference to FIG. 24. As shown, there are provided a function generator 73 and another function generator 74. These two function generators 73 and 74 are given the system frequency f and operate to output respective gas turbine exhaust gas temperature limiting values shown in FIG. 25. As shown in FIG. 24, the system frequency f is input to the function generators 73 and 74, which monitor the exhaust gas temperature TX4 and generate respective exhaust gas temperature limit values. However, the combustion gas temperature TX3 may be used in place of the exhaust gas temperature TX4. In this case, combustion gas temperature limit values are determined and generated for the purpose of monitoring the combustion gas temperature TX3.

Here, a case of using the exhaust gas temperature will be explained. A comparator 75 operates to compare an exhaust gas temperature limit value in the case of normal operation having a system frequency f with the exhaust gas temperature TX4, and if it is judged that the exhaust gas temperature TX4 is higher than the exhaust gas temperature limit value, then the comparator 75 issues an instruction signal to increase the generator output to other plants connected to the same electric power system. At the same time, the comparator 75 sends a signal to an AND logical unit 86 which functions to operate a system abnormality sensor to warn that a system abnormality has occurred and to instruct stoppage of the combustion gas temperature control section. The function generator 74 generates another exhaust gas temperature limit value for a short-period operation. If the exhaust gas temperature TX4 increases further, and a comparator 76 judges that the exhaust gas temperature TX4 exceeds the exhaust gas temperature limit value for a short-period operation, an output of the comparator 76 is sent to a timer 77, which upon elapse of a predetermined time sends a signal to a NOT logical unit 78, whereby the output of the NOT logical unit 78 becomes null. As a result, the system frequency abnormality signal which is the output of the AND logical unit 86 becomes null.

Figure 26:
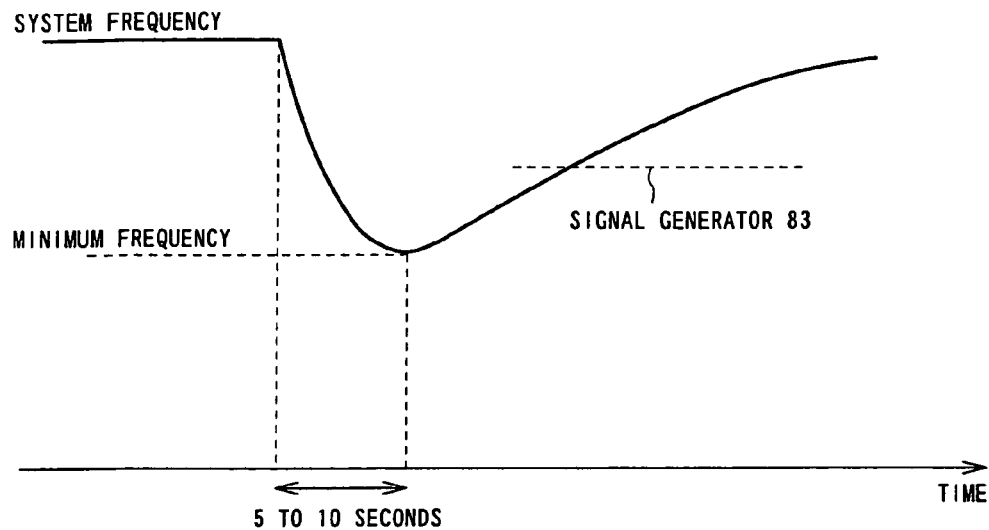
FIG. 26 is a graph showing changes from a drop of the system frequency to a recovery of the same.

FIG. 26 shows a change of the system frequency with time wherein the system frequency drops due to a cause such as disconnection of a generator from the electric power system and then recovers the normal value. Referring again to FIG. 24 which is explanatory of the operation of the system abnormality sensor 39, when the system frequency f exceeds a set value S3 of a signal generator 83, this is judged by a comparator 82. A signal generator 81 generates a set value S4. The system frequency f is input to a variation rate calculator 79 which calculates and issues variation rate of the system frequency f. A comparator 80 judges whether the thus issued system frequency variation rate exceeds the set value S4. When it is judged that the system frequency has recovered and the control system can be brought to normal operation, an AND logic unit 84 outputs a signal, so that output of a NOT logical unit connected to the AND logical unit 84 becomes null, whereby the system frequency abnormality signal becomes null.

Figure 27:
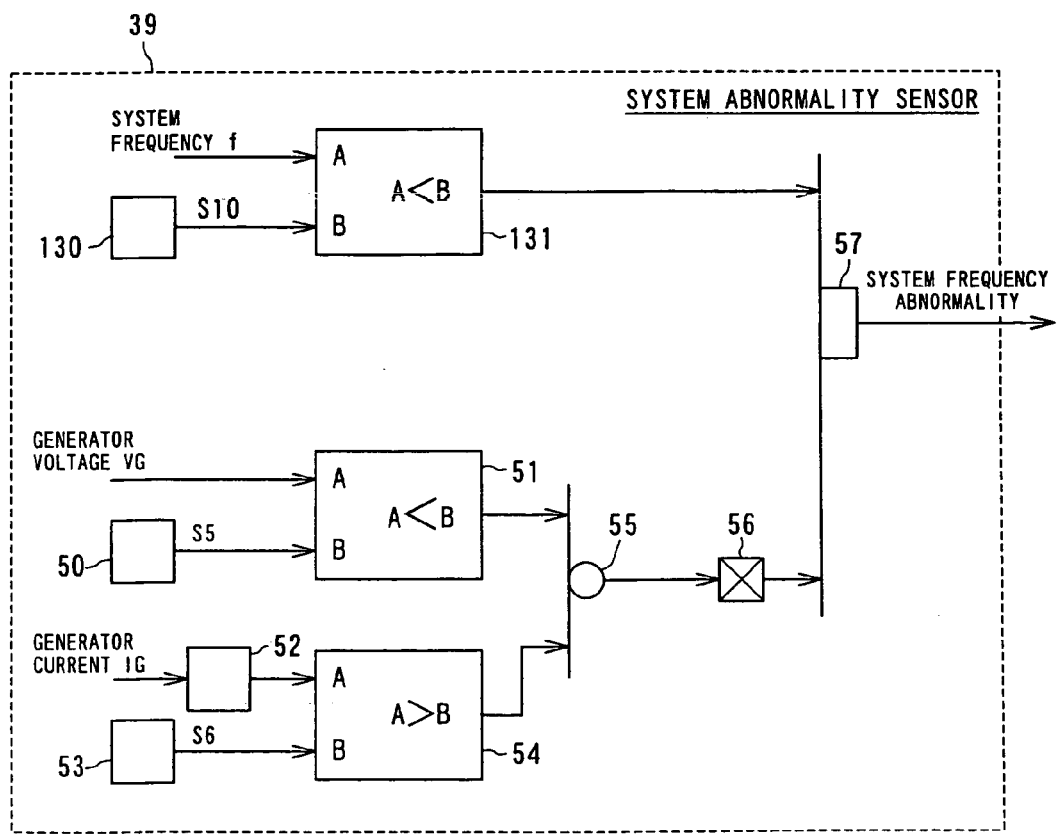
FIG. 27 is a block diagram showing a fourteenth embodiment of the invention.

A fourteenth embodiment of the invention will next be described with reference to FIG. 27, which shows an improvement if the system abnormality sensor 39. As shown, there is provided a comparator 51 to which are input the generator voltage VG and a predetermined set value S5 of generator voltage from a signal generator 50, and the generator voltage VG and the generator voltage set value S5 are compared in the comparator 51. The generator current IG is input to a variation rate calculator 52 in which a variation rate of the generator current IG is calculated. A comparator 54 compares the generator current variation rate with a predetermined set value S6 from a signal generator 53. When the generator voltage VG drops to or below the set value S5 or when the variation rate of the generator current IG exceeds the set value S6, an OR logical unit 55 sends its output to a NOT logical unit 56, so that the output of the NOT logical unit 56 becomes null. A comparator 131 receives the system frequency f and a predetermined system frequency set value S10 from a signal generator 130. When the system frequency f drops to or below the set value S10, the comparator 131 issues its output. The output from the comparator 131 and the output from the NOT logical unit 56 are sent to an AND logical unit 57. Therefore, even when the system frequency f drops to or below the set value S10 and the comparator 131 issues its output, the output of the AND logical unit 57 is maintained OFF, if the output of the NOT unit 56 is null. This means that if the generator voltage VG drops below the set value S5 or if the generator current variation rate is above the set value, it is judged that a temporary short-term system frequency drop is detected due to a system accident, and the output of the AND logical unit 57 is null, so that no system abnormality signal is issued.

Thus, it is possible to prevent erroneous operation of the system abnormality sensor in the event of a short-term system accident. It will be understood that FIG. 27 shows an example of the system abnormality sensor 39. This embodiment improves reliability of the system abnormality sensor.

Figure 28:
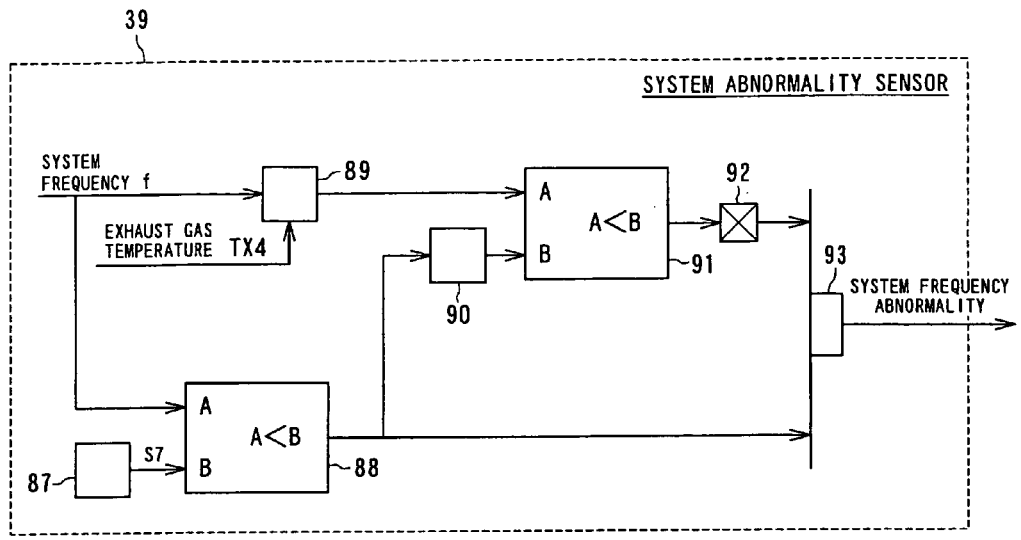
FIG. 28 is a block diagram showing a fifteenth embodiment of the invention.

A fifteenth embodiment of the invention will be described with reference to FIG. 28. As shown, the system frequency f and the exhaust gas temperature TX4 are input to a function generator 89, which generates an endurance (a fatigue life) of the turbine. The combustion gas temperature TX3 can be used in place of the exhaust gas temperature TX4. In this case, the endurance is determined based on the system frequency f and the combustion gas temperature TX3.

Figure 29:
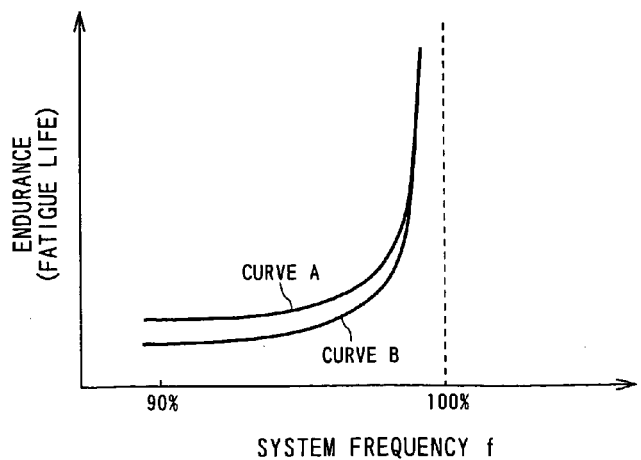
FIG. 29 is a graph showing characteristics of a function generator for calculating an endurance (a fatigue life) for gas turbine operation from the system frequency and the exhaust gas temperature, in the fifteenth embodiment of the invention.

FIG. 29 shows the relationship between the system frequency f and the endurance (the fatigue life) in the case of using the exhaust gas temperature. In FIG. 29, curves A and B indicate curves of different temperature parameters. In this figure, the system frequency is given and then the value of the exhaust gas temperature is given. If the value of the exhaust gas temperature TX4 coincides with the temperature parameter of the curve A, the value of the endurance can be read on the axis of ordinate. If the value of the exhaust gas temperature TX4 is a value intermediate between the curve A and the curve B, the value of the endurance can be read on the axis of ordinate by the interpolation method. The function generator 89 generates the thus obtained output of the endurance. The same method can be used also in the case of using the combustion gas temperature TX3.

Further description will be made with respect to the case of using the exhaust gas temperature. The system frequency f and a set value S7 from a signal generator 87 are input to and compared in a comparator 88. When it is judged by the comparator 88 that the system frequency f is below the set value S7, the comparator 88 sends its output to an AND logical unit 93, and if there is an input from a NOT logical unit 92, the AND logical unit 93 outputs a system frequency abnormality signal. The output of the signal generator 88 is input through a timer 90 to a comparator 91 to which the output from the function generator 89 is sent. When the system frequency f drops below the set value S7 and the comparator 88 issues an output, a time counter 90 starts counting the time. The comparator 91 compares the endurance from the function generator 89 and the time counted by the counter 90, and when the counted time exceeds the endurance, the comparator 91 supplies an output signal to the NOT logic unit 92, and its output becomes null, so that the output of the AND logical unit 93, which is the system abnormality signal, is stopped. When the output from the AND logical unit 93 becomes null, the combustion gas temperature control section, which has stopped it operation for the protection of the gas turbine, is again brought into operation. It will be understood that FIG. 28 also shows an example of the system abnormality sensor 39.

Figure 30:
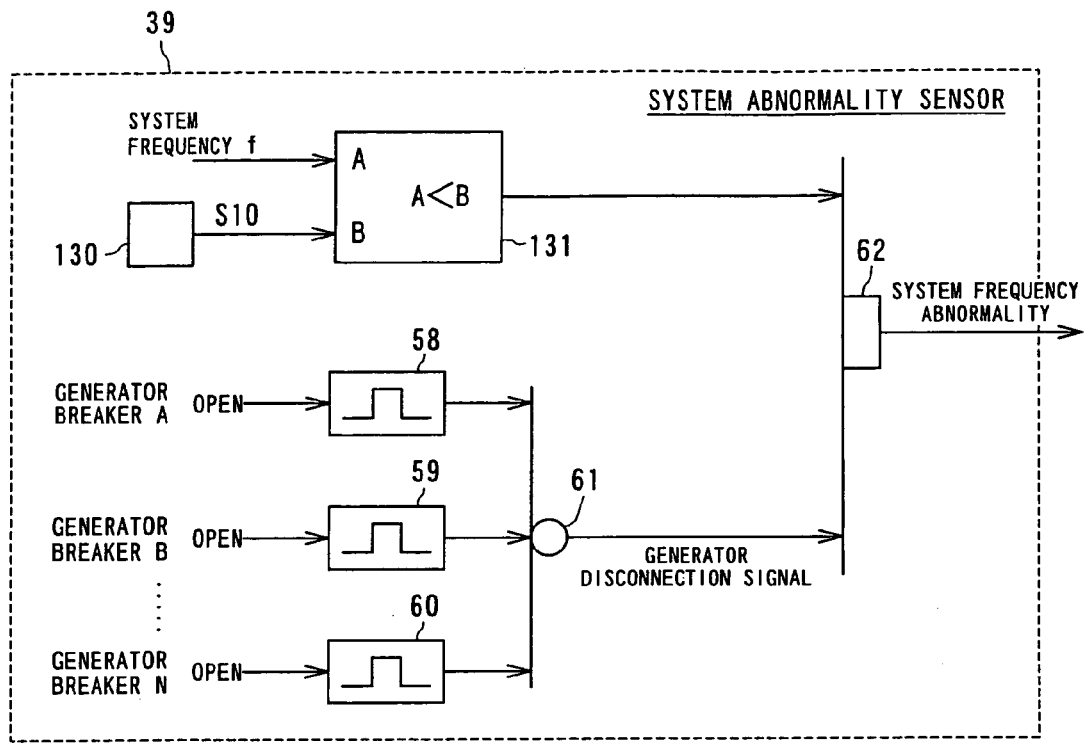
FIG. 30 is a block diagram showing a sixteenth embodiment of the invention.

A sixteenth embodiment of the invention will be described with reference to FIG. 30. As shown, this embodiment has the comparator 131 which is illustrated in FIG. 27 showing the fourteenth embodiment of the invention. As in the case of FIG. 27, the system frequency f and the set value S10 from the signal generator 130 are input to and compared in the comparator 131. The output of the comparator 131 is input to an AND logical unit 62. The output of the AND logical unit 62 constitutes a system frequency abnormality signal. Generator breakers A, B, . . . and N have timers 58, 59, . . . and 60 which include ON signals in the circuit breaking signals, respectively. These ON signals are issued for predetermined lengths of time, respectively, and sent to an OR logical unit 61 which issues a generator disconnection signal.

Figure 31:
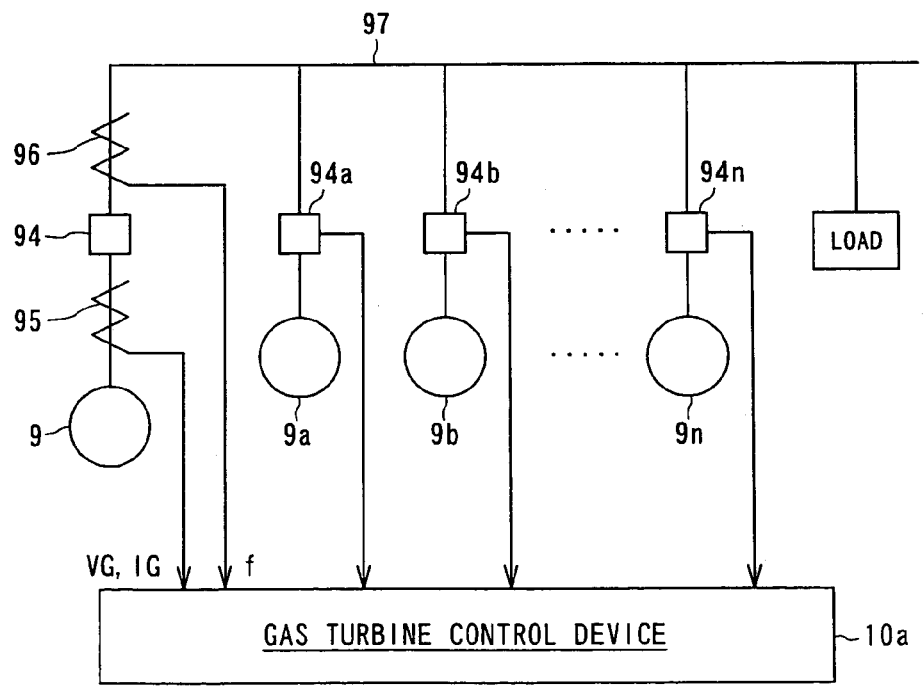
FIG. 31 is a graph showing a relationship between the electric power system and a generator of another power plant, in the sixteenth embodiment of the invention.

FIG. 31 shows a simplified view explanatory of an electric power system, in which transformers and other instruments are not shown for simplicity. In FIG. 31, a gas turbine control system 10a shown includes the gas turbine control system 10 which has already been described as prior art system and which operates to control the generator 9. The generator 9 is connected through a generator breaker 94 to a system 97 including a load to send electric power to the load. There are generators 9a, 9b, . . . and 9n for other plants. These generators 9a, 9b, . . . and 9n also send electric power through generator breakers 94a, 94b, . . . and 94n to the system 97. The generator voltage VG and the generator current IG described with reference to FIG. 27 are obtained at a sensor 95 which is shown representatively in FIG. 31. The system frequency f described with reference to FIG. 22 et seq. is obtained at a sensor 96 shown in FIG. 31. The opening and closing states of the generator breakers 94a, 94b, . . . and 94n are input to the gas turbine control system 10a. The signal of opening or interruption of the generator breaker A is derived at the generator breaker 94a in FIG. 31. Similarly, the signals of opening or interruption of the generator breakers B, . . . and N are derived at the generator breaker 94b, . . . and 94n, respectively.

As a possible cause of detection of system frequency abnormality as a result of variation of the system frequency f, disconnection of a generator connected to the power system can be considered. In a system in which a possibility of generator disconnection is high, generator disconnection, i.e., a state in which the generator breaker is opened so that power supply cannot be made, is detected as shown in FIG. 30. More specifically, when any one of the generator breakers A, B, . . . and N is opened, the OR logical unit 61 sends out an output to the AND logical unit 62, which sends out a system abnormality signal when the system frequency f is below the set value S10. Thus, a high reliability of the system abnormality detection is obtained.

The timers 58, 59, . . . and 60 are provided to detect generator disconnection as a cause of system abnormality phenomenon. A time length that is assumed to elapse from generator disconnection to a frequency drop that will occur with a delay as a result of the generator disconnection, is set in each of the timers 58, 59, . . . and 60. Each of these timers outputs an ON signal for the time length. In this embodiment, each generator breaker directly outputs a signal of opening and closing thereof to the gas turbine control system. Alternatively, another kind of signal representing generator disconnection could be sent to the gas turbine control system from another control system. It will be noted that FIG. 30 shows another example of the system abnormality sensor 39.

Figure 32:
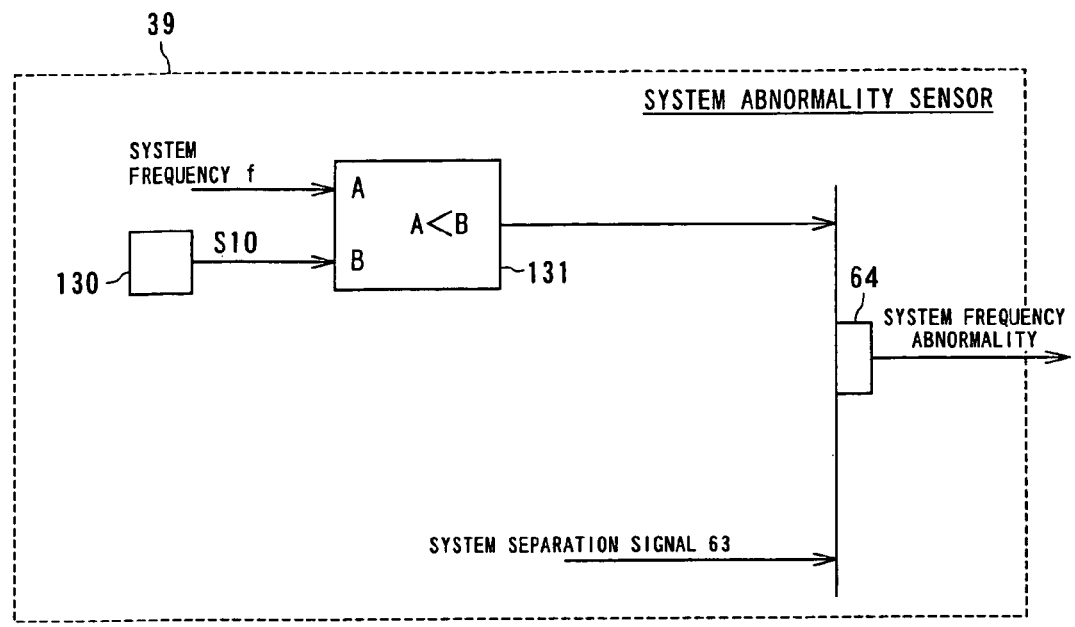
FIG. 32 is a block diagram showing a seventeenth embodiment of the invention.

A seventeenth embodiment of the invention will be described with reference to FIG. 32. As in the case of the fourteenth embodiment of FIG. 27, this embodiment has the comparator 131 to which the system frequency f and the set value S10 from the signal generator 130 are sent. The output of the comparator 131 and a system separation signal 63 are input to an AND logical unit 64, which outputs a system separation signal. The system separation signal 63 will be explained with reference to FIG. 33.

Figure 33:
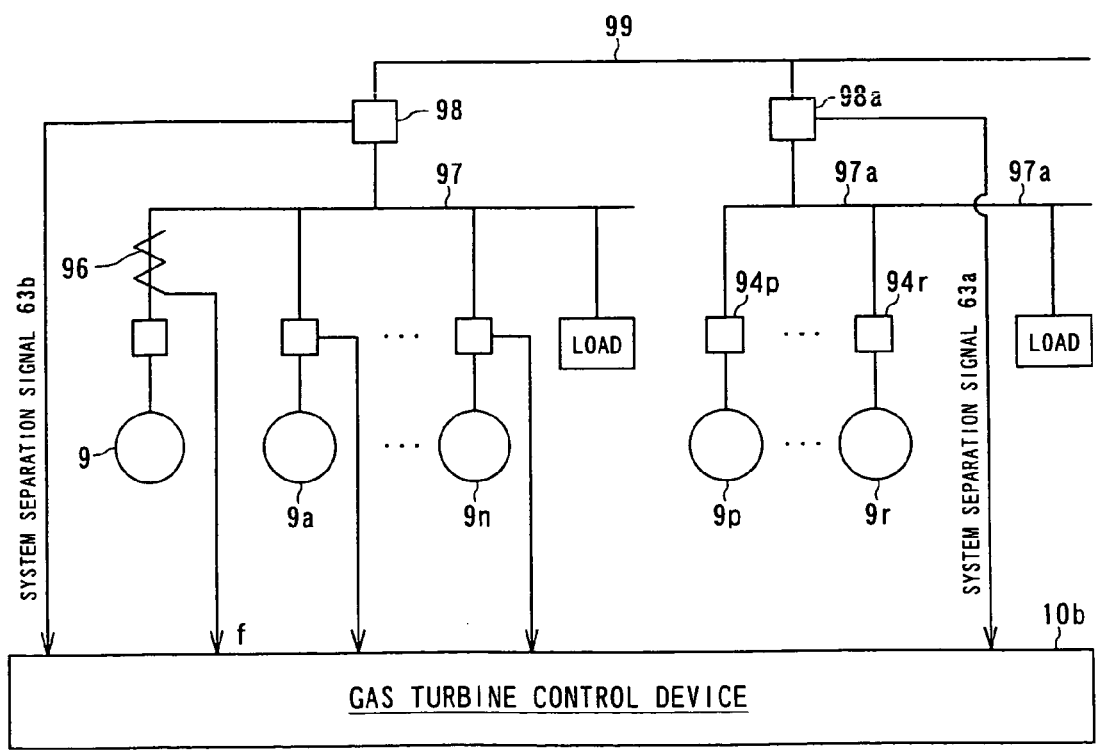
FIG. 33 is a diagram explanatory of system separation in an electric power system, in the seventeenth embodiment of the invention.

In FIG. 33, the gas turbine control system or device designated by 10b includes both the gas turbine control system or device 10 of the prior art and the gas turbine control system 10a according to this invention. The gas turbine control system 10b controls the generator 9. The same elements as in FIG. 31 are designated by the reference characters in FIG. 33 and description of these elements will be dispensed with. The difference of the: embodiment of FIG. 33 from that of FIG. 31 is that the former has an electric power system 97a separate from the electric power system 97, a principal electric power system 99 and inter-system breakers 98 and 98a. The separate electric power system 97a includes generators 9p, . . . and 9r, generator breakers 94p, . . . and 94r, and a load to the electric power system 97a. The electric power systems 97 and 97a are connected to the principal electric power system 99 via the inter-system breakers 98 and 98a, respectively.

When the inter-system breaker 98a is opened for a reason in the power system 97a, a large variation in the power demand in the principal electric power system 99 is produced so that the system frequency f detected by the sensor 96 changes largely. In this case, the system separation signal 63 (63a) representing the opening and closing state of the inter-system breaker 98a shown in FIG. 33 is sent to a gas turbine control system 10b. Similarly, when the inter-system breaker 98 is opened for a reason in the power system 97, a large variation in the power demand in the principal electric power system 99 is produced so that the system frequency f changes greatly. In the same manner as above, the system separation signal 63 (63b) representing the opening and closing state of the inter-system breaker 98 is sent to the gas turbine control system 10b.

A cause of a variation of the system frequency f detected by the system frequency abnormality sensor in a power system may include a possibility of interruption in a separate power system connected the same principal power system. Therefore, in a power system with which such a possibility is high, the system separation signal 63 (63a, 63b) is sent from the inter-system breaker 98 or 98a upon its opening. When the system separation signal 63 is input to the AND logical unit 64 as shown in FIG. 32, the output of the AND logical unit 64 becomes ON if the comparator 131 sends its output to the AND logical unit 64 as a result of the system frequency f dropping below the set value 130. Thus, a high reliability of the system frequency abnormality detection is obtained. In this embodiment, the system separation signal is sent from the inter-system breaker directly to the gas turbine control system. Alternatively, another kind of signal representing system separation could be sent to the gas turbine control system from another control system. It will be noted that FIG. 32 also shows a further example of the system abnormality sensor 39.

Figure 34:
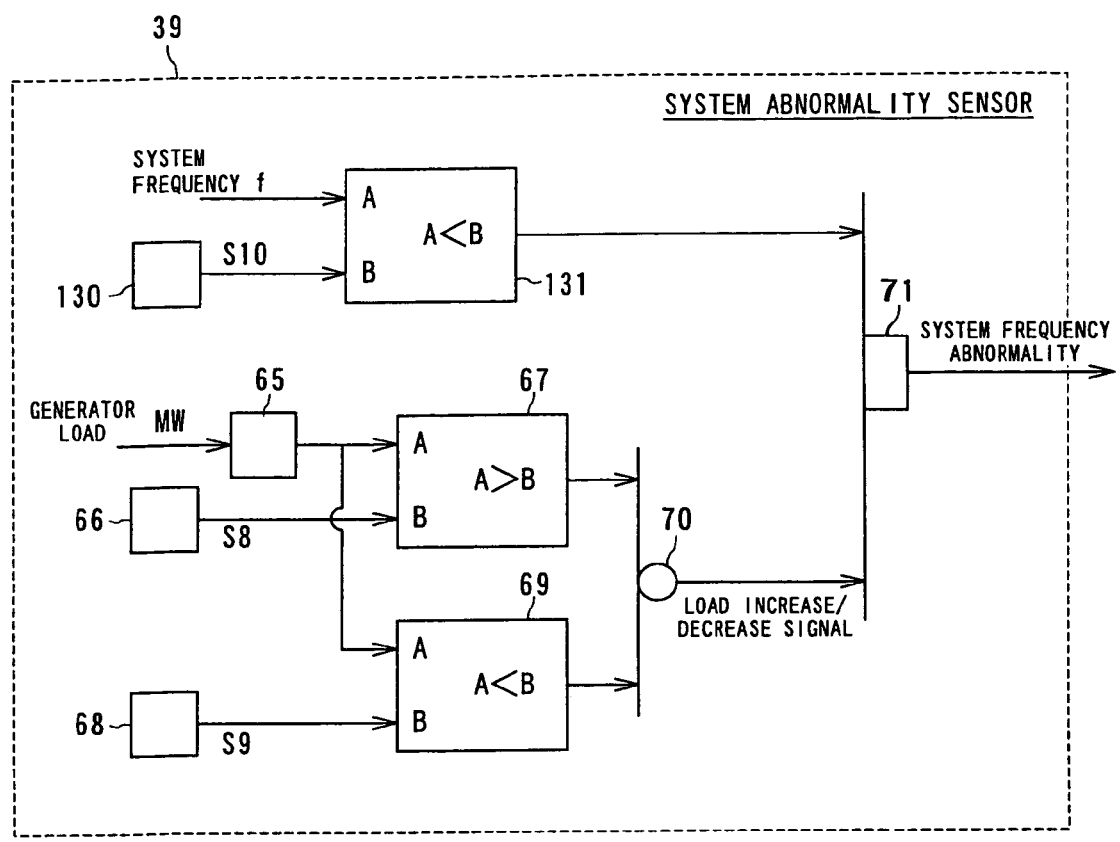
FIG. 34 is a block diagram showing an eighteenth embodiment of the invention.

An eighteenth embodiment of the invention will be described with reference to FIG. 34. As in the embodiment of FIG. 27, the eighteenth embodiment has the comparator 131 that receives the signal of system frequency f and a predetermined system frequency set value S10 from the signal generator 130. The output of the comparator 131 is sent to an AND logical unit 71. The eighteenth embodiment also has means to produce a load increase/decrease signal, which is produced as described below.

The generator load MW is input to a generator load variation rate calculator 65 and outputs the calculated generator load variation rate to a comparator 67. A signal generator 66 generates a predetermined set value S8 and sends it to the comparator 67. When the generator load variation rate exceeds the set value S8, the comparator 67 issues an ON signal representing load increase. To another comparator 69 are input the generator load variation rate from the calculator 65 and a predetermined set value S9 from a signal generator 68. When the generator load variation rate drops below the set value S9, the comparator 69 issues an ON signal representing load decrease. These load increase and decrease ON signals are input to an OR logical unit 70, which issues a load increase and decrease signal, which in turn is input to an AND logical unit 71. When the AND logical unit 71 receives the load increase and decrease signal as well as output signal from the comparator 131 indicating that the system frequency is below the set value S10, the AND logical unit 71 issues a system frequency abnormality signal. Thus, a high reliability of the system frequency abnormality signal is obtained. It will be understood that FIG. 34 also shows an example of the system frequency abnormality sensor 39.

Figure 35:
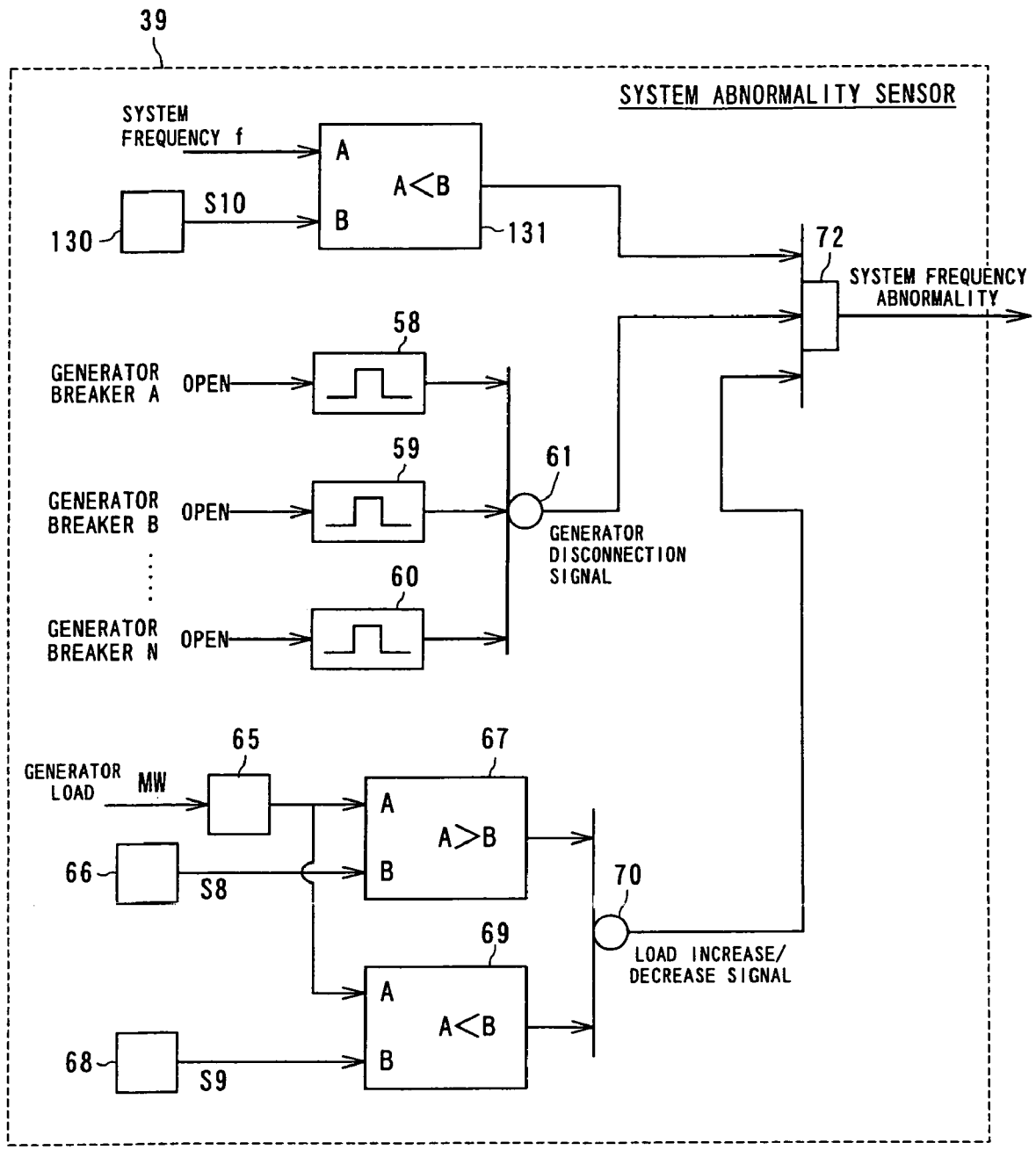
FIG. 35 is a block diagram showing a nineteenth embodiment of the invention.
Figure 36:
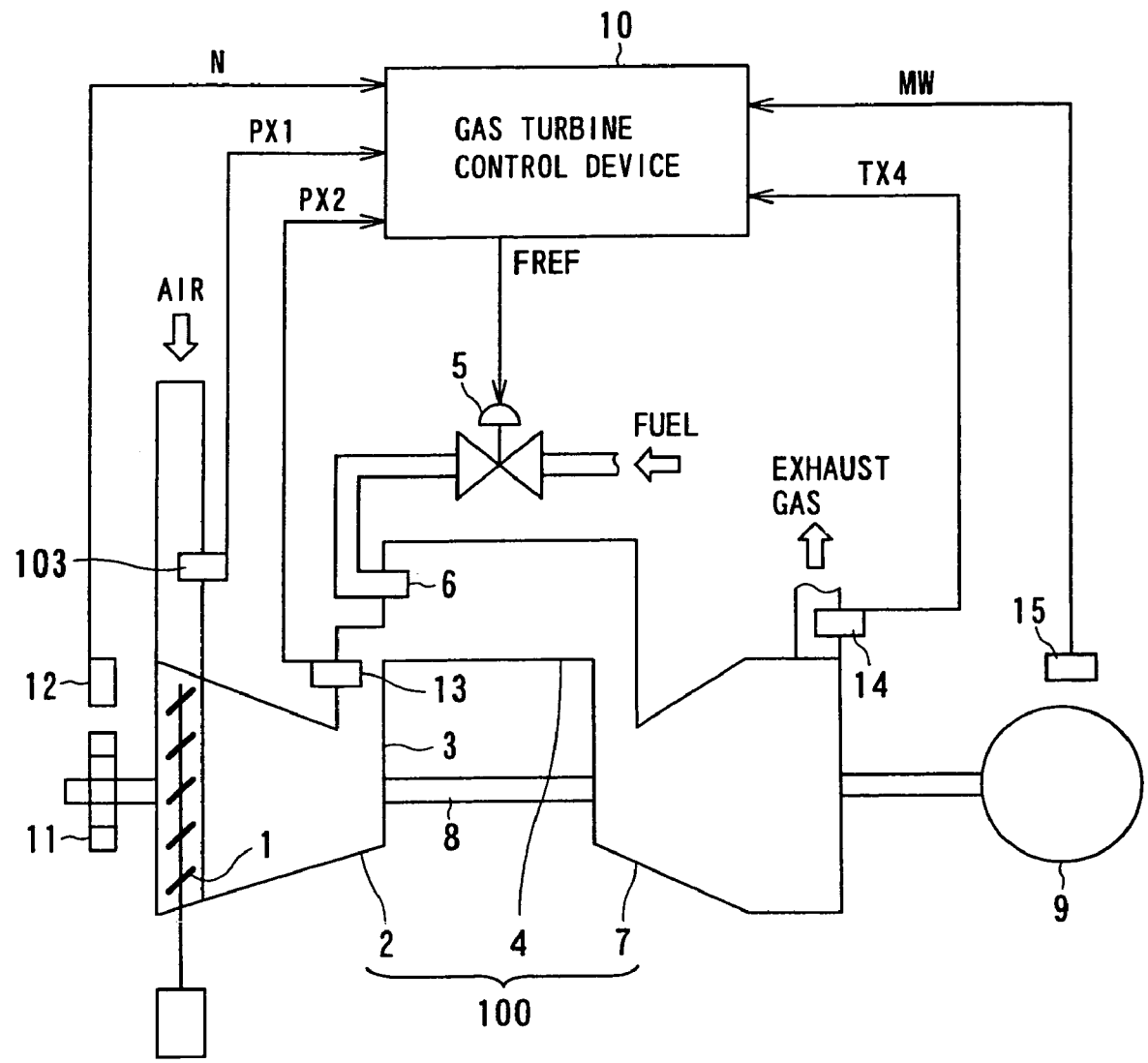
FIG. 36 is a schematic view showing a prior art gas turbine control system and a gas turbine electric power generating plant.

A nineteenth embodiment of the invention will be described with reference to FIG. 35. As in the embodiment of FIG. 27, this nineteenth embodiment has the comparator 131 that receives the signal of system frequency f and a predetermined system frequency set value S10 from the signal generator 130. Further, as in the embodiment of FIG. 30, this nineteenth embodiment has the generator breakers A, B, . . . and N having the timers 58, 59, . . . and 60 which issue the circuit breaking signals, respectively, and the OR logical unit 61. Furthermore, as in the embodiment of FIG. 34, this nineteenth embodiment has the generator load variation rate calculator 65, the comparators 67 and 69, the signal generators 66 and 68 for generating predetermined set values S8 and S9, respectively, and the OR logical unit 70, which issues a load increase and decrease signal. The output signal from the comparator 131, the generator disconnection signal from the OR logical unit 61, and the load increase and decrease signal from the OR logical unit 70 are sent to an AND logical unit 72. By combining, at the AND logical unit 72, the generator disconnection signal and the load increase and decrease signal with the output signal from the comparator 131 which indicates the system frequency has dropped below the set value S10, an even higher reliability of the system frequency abnormality detection can be obtained. It will be understood that FIG. 35 also shows an example of the system frequency abnormality sensor 39.

The present invention has been described as being applied to a power plant of the type in which a gas turbine and a generator are arranged coaxially on the same rotational shaft, but the invention is also applicable to a power plant in which a gas turbine, a generator and a steam turbine are arranged coaxially on the same rotational shaft. Further, the fuel may be either a gas fuel or a liquid fuel. In the case of using the liquid fuel, control of the flow rate of the fuel is carried out by controlling the flow rate of the fuel discharged from the outlet of the fuel pump and returned to the inlet of the same via a by-pass line. The present invention can be applied to such a liquid fuel supply system.

Further, the invention is also applicable to a gas turbine control system in which the critical operating parameters such as system frequency, generator voltage, generator current, exhaust gas temperature, combustion gas temperature, system separation and disconnection of the generator as described above are monitored and operator commands system frequency abnormality equivalent to the system frequency abnormality sensor if its signal corresponds to the system abnormality condition described above.

What is claimed is:

1. A gas turbine control system for controlling a gas turbine unit including an air compressor for producing compressed air, said compressor having inlet guide vanes or blades for adjusting an air flow rate into the compressor, a combustor for combusting a fuel mixed with the compressed air from the compressor to produce a combustion gas, a gas turbine receiving the combustion gas from the combustor and driven by the combustion gas to drive the compressor; and an electric generator connected to an electric power system:

said gas turbine control system comprising:

an inlet guide blade control mechanism configured to control the inlet guide vanes or blades to change air flow rate into the compressor;

a fuel control valve provided to change flow rate of the fuel into the combustor;

a speed-load control mechanism including a speed control mechanism and a load control mechanism, said speed-load control configured to operate on said fuel control valve to control the flow rate of the fuel so that the gas turbine has a rotational speed coinciding with a set speed value;

a combustion gas temperature control mechanism that controls the flow rate of the fuel so that the combustion gas temperature does not exceed a set temperature value;

a system frequency abnormality sensor that operates to detect such a variation of frequency of the electric power system as to cause the power system to go out of normal operation; and said combustion gas temperature control mechanism having a disabling mechanism responsive to operation of said system frequency abnormality sensor to make the combustion gas temperature control mechanism inoperative to thereby have said fuel control valve controlled by the speed-load control mechanism, to restore a system frequency.

2. The gas turbine control system according to claim 1, wherein said disabling mechanism has a mechanism to make the combustion gas temperature control mechanism inoperative during a length of time in which the system frequency is expected to recover.

3. A gas turbine control system according to claim 1, further comprising:

a limiter mechanism configured to limit a response of said speed control mechanism of the speed-load control mechanism in response to operation of said system frequency abnormality sensor, for a length of time within which the system frequency is expected to recover.

4. A gas turbine control system according to claim 1, further comprising:

a limiter mechanism configured to change a control constant for use in control of the flow rate of the fuel in response to an increase of the system frequency as detected by said system frequency abnormality sensor, to prevent loss of flame of the turbine.

5. The gas turbine control system according to claim 1, wherein said system frequency abnormality sensor operates to detect a system frequency abnormality by comparing an exhaust gas temperature of the gas turbine and an exhaust gas temperature limit value determined on the basis of the system frequency.

6. The gas turbine control system according to claim 1, wherein said system frequency abnormality sensor operates to detect a system frequency abnormality by comparing a combustion gas temperature and a combustion gas temperature limit value determined on the basis of the system frequency.

7. The gas turbine control system according to claim 1, wherein said system frequency abnormality sensor operates to stop detection of a system frequency abnormality when it detects at least one of a generator voltage reduction and an abrupt increase of a generator current.

8. The gas turbine control system according to claim 1, wherein said system frequency abnormality sensor operates in relation to an endurance determined on the basis of the system frequency and one of an exhaust gas temperature and a combustion gas temperature.

9. The gas turbine control system according to claim 1, wherein said system frequency abnormality sensor operates on the basis of a variation of the system frequency out of a predetermined range of the system frequency and a signal of disconnection of the generator from the electric power system.

10. The gas turbine control system according to claim 1, wherein said system frequency abnormality sensor operates on the basis of a variation of the system frequency out of a predetermined range of the system frequency and a signal of system separation.

11. The gas turbine control system according to claim 1, wherein said system frequency abnormality sensor operates on the basis of a variation of the system frequency out of a predetermined range of the system frequency and a variation in the output of the generator.

12. The gas turbine control system according to claim 1, wherein said system frequency abnormality sensor operates on the basis of a variation of the system frequency out of a predetermined range of the system frequency, a signal of disconnection of the generator from the electric power system and a variation in the output of the generator.

* * * * *